United States Patent
Kato

[11] Patent Number: 6,163,384
[45] Date of Patent: *Dec. 19, 2000

[54] TRANSMISSION DEVICE CAPABLE OF COPING WITH EXTERNAL LIGHT INTRUDING IN THE SAME

[75] Inventor: Tokunori Kato, Ichinomiya, Japan

[73] Assignee: Brother Kogyo Kabushiki Kaisha, Nagoya, Japan

[ * ] Notice: This patent is subject to a terminal disclaimer.

[21] Appl. No.: 09/114,180

[22] Filed: Jul. 13, 1998

[30] Foreign Application Priority Data

Jul. 14, 1997  [JP]  Japan ................... 9-188690

[51] Int. Cl.[7] ........................ H04N 1/00
[52] U.S. Cl. ............. 358/404; 358/401; 358/444; 358/468; 358/1.14
[58] Field of Search ............... 358/296, 401, 358/444, 468, 501, 1.1, 1.14, 1.18, 1.16, 502, 404; 399/31, 27, 33; 347/3

[56] References Cited

U.S. PATENT DOCUMENTS 5,706,037  1/1998  McIntyre ................... 347/3
5,721,581  2/1998  Saito et al. ................ 347/249
5,900,888  5/1999  Kurosawa .................. 347/7

FOREIGN PATENT DOCUMENTS

| 7-242044 | 9/1995 | Japan . |
| 8-167970 | 6/1996 | Japan . |
| 8-267731 | 10/1996 | Japan . |
| 8-267782 | 10/1996 | Japan . |
| 8-281966 | 10/1996 | Japan . |
| 10-341308 | 12/1997 | Japan ................ B41J 29/46 |
| 9-314964 | 12/1997 | Japan ................ B41J 29/46 |
| 10-337938 | 12/1998 | Japan ................ B41J 29/46 |

*Primary Examiner*—Edward L. Coles
*Assistant Examiner*—Mark Wallerson
*Attorney, Agent, or Firm*—Oliff & Berridge, PLC

[57] ABSTRACT

To provide a transmission device capable of preventing erroneous operations when light intrudes into the transmission device during printing of facsimile data. When external light is detected within the transmission device during printing of facsimile data, a print unit stops printing of the facsimile data, and also the facsimile data is stored as backup data in a memory. Then, after storing of the facsimile data as the backup data in the memory is completed, the print unit automatically performs printing of the backup data.

19 Claims, 14 Drawing Sheets

FIG. 13 (a) | PRINT BACKUP?

FIG. 13 (b) | 1. YES  2. NO

FIG. 14 | PRINTING

FIG. 15 (a) | FAX PRINT OK?

FIG. 15 (b) | 1. YES  2. NO

FIG. 16 (a) | DELETE BACKUP?

FIG. 16 (b) | 1. YES  2. NO

FIG. 17 | NO BACKUP DATA PRESENT

FIG. 18

ACTIVITY REPORT

TIME : 05/08/1997 13:06
NAME :
FAX :
TEL :

| DATE | TIME | FAX NO./NAME | DURATION | PAGE(S) | RESULT | COMMENT | |
|------|-------|--------------|----------|---------|--------|---------|------|
| 05/08 | 10:18 | 123 | 27 | 01 | OK | TX | ECM |
| 05/08 | 10:29 | 123 | 04 | 01 | OK | TX | ECM |
| 05/08 | 10:39 | 123 | 27 | 01 | OK | TX | ECM |
| 05/08 | 10:44 | 987 | 08 | 01 | OK | TX | ECM |
| 05/08 | 10:48 | 987 | 36 | 01 | OK | TX | ECM |
| 05/08 | 10:51 | 7777 | 08 | 01 | OK | RX | ECM |
| 05/08 | 10:54 | 123 | 08 | 01 | OK | TX | ECM |
| 05/08 | 10:56 | 7777 | 01 | 02 | OK | RX | ECM |
| 05/08 | 11:00 | 123 | 09 | 00 | OK | TX | ECM |
| 05/08 | 11:02 | 7777 | 09 | 01 | OK | RX | ECM |
| 05/08 | 11:07 | 7777 | 08 | 01 | NG | TX | ECM |
| 05/08 | 11:12 | 321 | 39 | 01 | OK | RX | ECM |
| 05/08 | 11:15 | 7777 | 02 | 01 | OK | TX | ECM |
| 05/08 | 11:18 | 123 | 04 | 01 | OK | TX | ECM |
| 05/08 | 11:21 | 123 | 08 | 01 | OK | TX | ECM |
| 05/08 | 11:25 | 123 | 09 | 01 | OK | RX | ECM |
| 05/08 | 11:27 | 7777 | 09 | 01 | OK | TX | ECM |
| 05/08 | 11:29 | 321 | 39 | 00 | NG | TX | ECM |
| 05/08 | 11:33 | 123 | 04 | 01 | OK | TX | ECM |
| 05/08 | 11:36 | 123 | 08 | 01 | OK | TX | ECM |
| 05/08 | 11:39 | 123 | 09 | 01 | OK | TX | ECM |
| 05/08 | 11:41 | 7777 | 09 | 00 | NG | RX | ECM |
| 05/08 | 11:51 | 654 | 09 | 01 | OK | TX | ECM BKUP |
| 05/08 | 12:55 | 123 | 39 | 01 | OK | TX | ECM BKUP |
| 05/08 | 13:02 | 123 | 25 | 01 | OK | TX | ECM BKUP |

BUSY: BUSY/NO RESPONSE
NG  : POOR LINE CONDITION
CV  : COVERPAGE
CA  : CALL BACK MSG
POL : POLLING
RET : RETRIEVAL

TRANSMISSION DEVICE CAPABLE OF COPING WITH EXTERNAL LIGHT INTRUDING IN THE SAME

BACKGROUND OF THE INVENTION

1. Field of the Invention

The present invention relates to a transmission device capable of transmission and printing of facsimile data.

2. Description of Related Art

Conventionally, there has been known a facsimile device including an ink jet printer capable of printing an image on a recording sheet based on facsimile data. The printer includes a cartridge storing ink and a print head formed with ink passages and nozzles. Ink in the cartridge is supplied through the ink passages and ejected through the nozzles toward a recording sheet, thereby forming an image on the recording sheet.

However, the ink passages can be clogged with ink, so that ink ejection become defective. In order to determine whether the ink passages are clogged or not, an indication mark, such as a circular black dot, is printed at a predetermined position on the recording sheet, and then, a mark sensor attempts to detect the indication mark. If the mark sensor cannot properly detect the indication mark, it is determined that the printing is defective.

When printing is determined to be defective, a message is displayed on a display screen to inform the user of this condition. Also, the facsimile device is switched to its memory mode wherein received facsimile data is stored as backup data in a memory without printing of the facsimile data being performed.

However, in the conventional facsimile device, when external light invades into the facsimile device during detection of the indication mark, the mark sensor erroneously detects the indication mark. More specifically, when external light impinges on the mark sensor that is detecting the indication mark, the detecting results of the mark sensor become inaccurate because of a relationship between intensity of the external light and density of the indication mark. As a result, operations are erroneously performed and the facsimile device is switched to the memory mode.

SUMMARY OF THE INVENTION

In order to solve this problem, it is conceivable to detect presence and absence of external light before printing operations are started. That is, if external light is detected before printing operations, then the printing operations are performed without attempting to detect the indication mark. However, in this case, the facsimile device cannot cope with external light if the external light intrudes into the facsimile device during printing operations are performed.

It is an objective of the present invention to overcome the above-described problems, to provide a transmission device capable of preventing erroneous operations caused by external light intruding into the transmission device during printing, and also to provide a method of and a program storage medium storing a program of controlling the transmission device.

In order to achieve the above and other objectives, there is provided a transmission device including a frame, a receiving unit, a buffer memory, a storage member, a print unit, a backup memory, a first sensor, a second sensor, first control means, second control means, and fourth control means. The receiving unit is connected to a remote transmission device and receives image data from the remote transmission device. The buffer memory temporality stores the image data. The storage member stores and supplies recording material. The print unit prints an image based on the image data and an indication mark on a recording medium having a print region and an outside region. The image is printed in the print area and the indication mark is printed in a first predetermined position in the outside region with using the recording material. The first sensor detects the indication mark printed on the recording medium at a second predetermined position within the second predetermined position. The second sensor detects external light at the second predetermined position. The first control means controls the print unit. The second control means and the third control mean control the print unit and the backup memory. When the first sensor falsely detects the indication mark while the print unit is printing under the aegis of the first control means, the second control means controls the print unit to stop printing and the backup memory to start storing the image data. When the second sensor detects external light while the print unit is printing under the aegis of the first control means, the third control means controls the print unit to stop printing, and the backup memory to start storing the image data.

There is also provided a transmission device including a frame a storage member, a receiving unit, a buffer memory, a print unit, a first sensor, a second sensor, and backup memory. The storage member stores and supplies recording material. The receiving unit is connected to a remote transmission device and receives image data from the remote transmission device. The buffer memory temporality stores the image data. The print unit prints an image based on the image data and an indication mark on a recording medium having a print region and an outside region outside the print region. The image is printed within the print area and the indication mark is printed at a first predetermined position in the outside region with using the recording material supplied from the storage member. The first sensor detects the indication mark printed on the recording medium at a second predetermined position within the frame. The second sensor detects external light at the second predetermined position. When the first sensor properly detects the indication mark while the print unit is printing, the print unit continues printing, and the backup memory does not store the image data. When the first sensor falsely detects the indication mark while the print unit is printing and the second sensor does not detect external light, the print unit stops printing, and the backup memory stores the image data. When the second sensor detects external light while the print unit is printing, the print unit stops printing, and the backup memory stores the image data.

Further, there is provided a program storage medium storing a program for controlling a transmission device including a frame defining an internal space. The program includes a receiving program of receiving image data, a temporary storing program of temporarily storing the image data into a buffer memory, a first printing program of printing an image based on the image data and an indication mark on a recording medium when the image data is received, a first detecting program of detecting the indication mark printed on the recording medium at a predetermined position within the internal space, a first judging program of judging whether the indication mark is detected properly or falsely, a second detecting program of attempting to detect external light at the predetermined position, a second judging program of judging whether the external light is detected or not, a first stopping program of stopping printing when the indication mark is falsely detected while the image and the indication mark are being printed and external light is not detected, a first storing program of storing the image data into a backup memory when the indication mark is falsely detected while the image and the indication mark are being printed and external light is not detected, a second stopping program of stopping printing when external light is detected while the image and the indication mark are being printed, and a second storing program of storing the image data into the backup memory when external light is detected while the image and the indication mark are being printed.

There is also provided a method of controlling a transmission device including a frame defining an internal space. The method comprising the steps of (a) receiving image data, (b) temporarily storing the image data into a buffer memory, (c) starting printing an image based on the image data and an indication mark on a recording medium when the image data is received, (d) detecting the indication mark printed on the recording medium at a predetermined position within the internal space, (e) judging whether the indication mark is detected properly or falsely, (f) attempting to detect external light at the predetermined position, (g) stopping printing when the indication mark is falsely detected while the image and the indication mark are being printed and external light is not detected, (h) storing the image data into a backup memory when the indication mark is falsely detected while the image and the indication mark are being printed and external light is not detected, (i) stopping printing when external light is detected while the image and the indication mark are being printed, and (j) storing the image data into the backup memory when external light is detected while the image and the indication mark are being printed.

BRIEF DESCRIPTION OF THE DRAWINGS

The particular features and advantages of the invention as well as other objects will become more apparent from the following description taken in connection with the accompanying drawings, in which:

FIG. 13(a) is a view showing a message inquiring a user of necessity of printing of backup data;

FIG. 13(b) is a view showing YES and NO selection displayed in alternation with the message of FIG. 13(a);

FIG. 14 is a view showing a message informing the user that a printing operation is presently being performed;

FIG. 15(a) is a view showing a message asking the user whether a received facsimile message should be printed out;

FIG. 15(b) is a view showing YES and NO selection displayed in alternation with the message of FIG. 15(a);

FIG. 16(a) is a view showing a message asking the user a permission to erase backup data from a RAM;

FIG. 16(b) is a view showing YES and NO selection displayed in alternation with the message of FIG. 16(a);

FIG. 17 is a view showing a message informing the user that there is no backup data stored in the RAM; and FIG. 18 is a view showing an example of a transmission maintenance report outputted by the facsimile device of FIG. 1.

DETAILED DESCRIPTION OF THE PREFERRED EMBODIMENT

A transmission device according to a preferred embodiment of the present invention will be described while referring to the accompanying.

In the present embodiment, a facsimile device including an ink jet printer will be described as an example of the transmission device according to the present invention. It should be noted that in the following description, the expression "at reception of facsimile data" is used throughout the description to define a specific time when facsimile device is being received by the facsimile device before printing or storing of the facsimile data is started.

Figure 1:
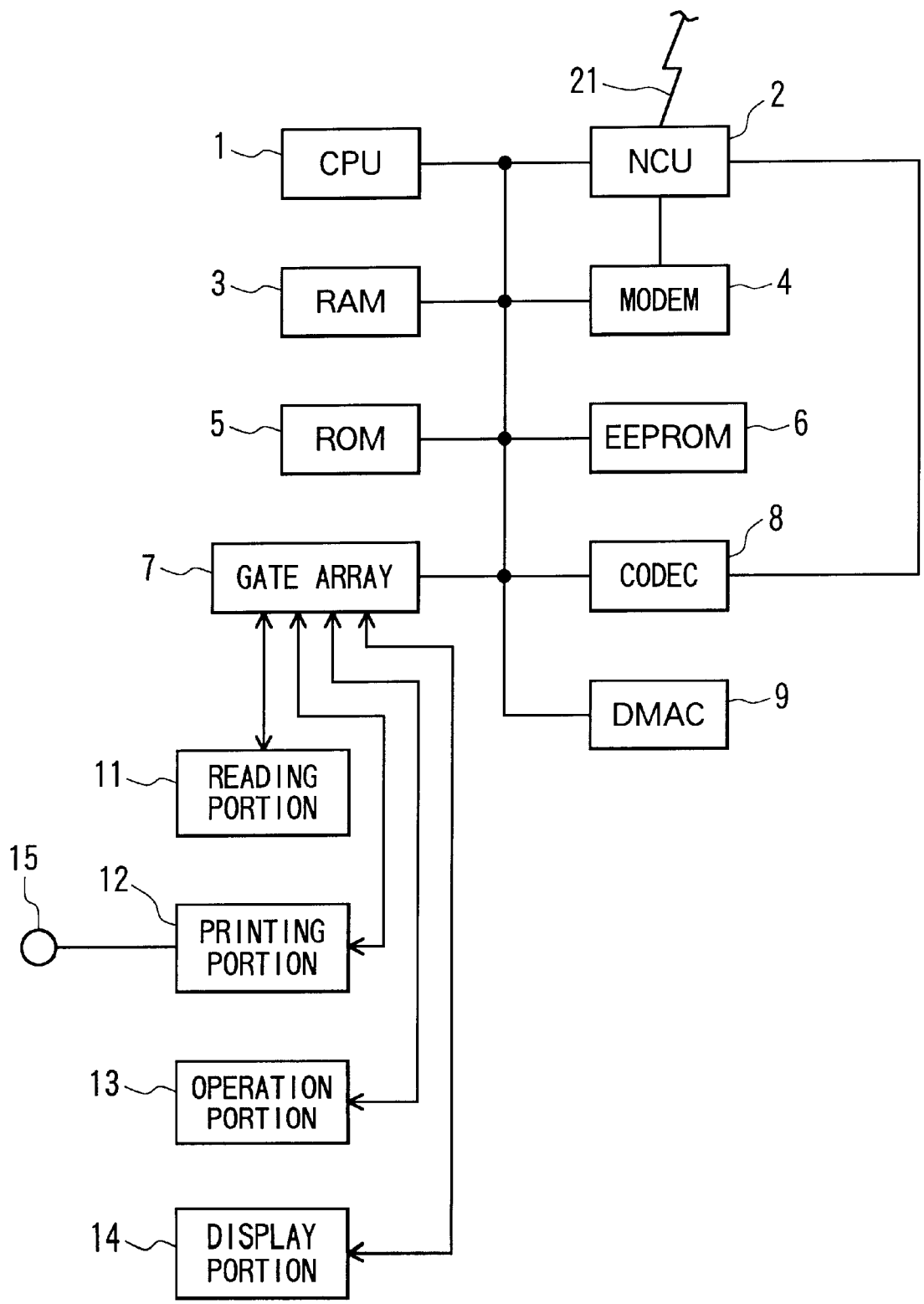
FIG. 1 is a block diagram showing a facsimile device as an example of a transmission device according to the present invention.

FIG. 1 is a block diagram showing electrical components of the facsimile device. The facsimile device includes a center processing unit (CPU) 1, a network control unit (NCU) 2, a random access memory (RAM) 3, a modem 4, a read only memory (ROM) 5, an electrically erasable and programmable read only memory (EEPROM) 6, a gate array 7, a codec 8, a direct memory access controller (DMAC) 9, a reading portion 11, a printing portion 12, an operation portion 13, and a display portion 14. The CPU 1, the NCU 2, the RAM 3, the modem 4, the ROM 5, the EEPROM 6, the gate array 7, the codec 8, and DMAC 9 are connected together by a bus line. Although not shown in the drawings, the bus line includes an address bus, data bus, and a control signal line. The reading portion 11, the printing portion 12, the operation portion 13, and the display portion 14 are individually connected to the gate array 7. The modem 4 and the codec 8 are connected to the NCU 2. The NCU 2 is further connected to a transmission line, that is, a telephone line 21 in this embodiment. The printing portion 12 includes a mark sensor 15.

The CPU 1 performs overall control of the facsimile device. The NCU 2 performs network control. The RAM 3 has a plurality of regions and stores a variety of data, such as received facsimile data, received voice data, and response message data, in each predetermined region. Specifically, the RAM 3 has a buffer region and a storage region. The buffer region temporality stores received facsimile data. The storage region stores backup reception data and backup transmission data which is collectively referred to as backup data hereinafter. A battery (not shown), such as rechargeable battery, provides a backup power source to the RAM 3. The modem 4 modulates transmission data and demodulates reception data. The ROM 5 stores data of a variety of programs and initial setting values. The EEPROM 6 stores dot counters, a mark flag, a backup flag, a flag A, a flag B, and a flag C in predetermined corresponding regions, and also stores resister values for these counters and flags. Each of these flags can be selectively set to a value of 1 and 0. When the value of the flag is 1, the flag is referred to as being ON. On the other hand, if the value of the flag is 0, the flag is referred to as being OFF.

The flag A, the flag B, and the flag C indicate whether or not an indication mark could be properly detected while printing of backup data as described later. The gate array 7 functions as an input and output interface for the CPU 1, and performs a variety of image processes, such as analog-to-digital conversion for image signals outputted from the reading portion 11. The codec 8 encodes transmission data and decodes received facsimile data. Also, when the facsimile device is in its answering machine mode, the codec 8 converts response message data stored in the RAM 3 into analog voice signals and outputs the signals to the NCU 2, and also converts analog voice signals from the NCU 2 into voice data and stores the data into the RAM 3. The DMAC 9 stores data in and retrieves data from the RAM 3.

The reading portion 11 includes a light source, a color charge coupled device (CCD), an image sensor, and a document feed motor (not shown). The reading portion 11 outputs analog color image signals.

The printing portion 12 includes a printing device (not shown), such as an ink jet printing device in the present embodiment, and the mark sensor 15. The printing device performs printing of data, that is, prints an image based on the data, within a print area of a recording sheet. The data includes received facsimile data, retrieved image data, and transmission maintenance information data. The printing device also prints an indication mark at a predetermined position outside of the print area and close to a rear edge of the recording sheet.

The printing device includes an ink tank, a print head, and a moving mechanism. The ink tank, which is a cartridge type in this embodiment, is freely detachably mounted on the print head. The ink tank stores black ink and three or more different colored inks separately. The print head is formed with a plurality of nozzles and a plurality of ink passages connecting the nozzles with the ink tank. Each different colored ink is supplied from the ink tank through the ink passages and ejected through the nozzles onto the recording sheet. The moving mechanism moves the print head in a main scanning direction during printing operations. In this way, a band's worth of image, that is, one line corresponding to the number of nozzles of each color, can be printed simultaneously.

It should be noted that monochrome printing can be performed with black ink only if desired. In the present embodiment, an image is printed in monochrome using black colored ink only.

After printing of one page's worth of facsimile data has been completed, the indication mark is printed on the recording sheet at the predetermined position. The indication mark can be a small black circular dot and is used to indicate whether the ink passages are clogged up. The mark sensor 15 is a reflection type photoelectric tube and has a light source, such as a light emitting diode. The mark sensor 15 detects the indication mark printed on the recording sheet and also external light intruding into the facsimile device. Detection of the indication mark is performed when a feeding mechanism (not shown) feeds the recording sheet so that the indication mark is brought into a predetermined mark detecting position.

The printing portion 12 also includes a cleaning mechanism for cleaning the ink passages from the cartridge to the nozzles. The cleaning mechanism uses a motor-driven pump to circulate each different colored ink through the ink passages. Because the cleaning mechanism has a well-know configuration, detailed description of the cleaning mechanism will be omitted.

The operation portion 13 includes a numeral pad formed from a plurality of key switches, and outputs an operation signal according to key switches operated by the user.

The display portion 14 includes a liquid crystal display (LCD). The display portion 14 displays a variety of messages and symbols on the LCD under control of the CPU 1.

Next, an explanation will be provided for main operations of the facsimile device. When the facsimile device receives facsimile data from a remote facsimile device, the facsimile device performs operations according to combined settings of the mark flag and the backup flag stored in the EEPROM 6.

The mark flag represents whether an indication mark should be printed on a recording sheet or not. The backup flag represents whether received facsimile data should be backed up under predetermined conditions. The mark flag and the backup flag are both set to ON when the facsimile device is originally shipped from a manufacture factory. The user can freely change the ON and OFF setting of the mark flag and the backup flag separately by operating predetermined key switches of the operation portion 13. For example, when two predetermined key switches provided to the operation portion 13 are simultaneously pressed, then the mark flag is switched from ON to OFF or from OFF to ON. The backup flag in the same way can be switched from ON to OFF or from OFF to ON.

The user is provided with instructions on how to switch setting of the mark flag in, for example, an instruction manual of the facsimile device. However, instructions on how to switch settings of the backup flag will only be disclosed to users making a specific request for the information. This is because it is assumed that only an extremely small number of users will want to prevent back up of received data.

First, the situation will be described for when both the mark flag and the backup flag are ON, that is, both have values set to 1, and when no external light impinges on the mark sensor 15. When the facsimile device receives facsimile data under these conditions, the printing portion 12 performs printing of one page's worth of the facsimile data on the recording sheet using black ink. After printing is completed, the indication mark is printed on the recording sheet at the predetermined position. When the indication mark printed on the recording sheet is transported to the predetermined mark detecting position, the mark sensor 15 detects the indication mark. If the indication mark is properly detected, it is determined that the indication mark has been printed properly. Then, the same operations are repeated while attempting to detect external light within the facsimile device until a final page is printed out.

On the other hand, if the indication mark cannot be properly detected on a specific page while no external light is detected within the facsimile device, it is determined that the ink passages are clogged. Then, the facsimile device is switched to its memory reception mode starting from the specific page on which the indication mark in question was printed. That is, the printing portion 12 stops printing of the facsimile data, and the facsimile data for the present and subsequent pages is stored as backup reception data in the RAM 3.

Then, after reception of the facsimile data is completed, the display portion 14 displays on the LCD a message informing the user that the ink passages for black ink are clogged and that the ink passages need to be cleaned. After the user operates predetermined key switches to input a command for cleaning of the ink passages, cleaning processes are executed accordingly. Then, the printing portion 12 automatically performs printing of the backup reception data and the indication mark. If the indication mark is properly detected for every page, then the backup reception data is automatically erased from the RAM 3. If the indication mark for any page is not properly detected, the display portion 14 displays on the LCD a message asking the user whether or not printing has been properly performed. If the user indicates that printing has been properly performed, then the backup reception data is deleted from the RAM 3. The user can indicate proper printing by operating certain key switches.

Next, the situation will be described for when external light is detected. If external light intrudes into the facsimile device, the indication mark may not be properly detected even if the indication mark has been correctly printed.

If external light is detected during printing of facsimile data for a particular page, the facsimile device is switched to its memory reception mode from a next page after the particular is printed out. That is, facsimile data for the subsequent pages is stored as backup reception data in the RAM 3 without the printing portion 12 performing printing of the facsimile data. After reception of the facsimile data is completed, the printing portion 12 automatically performs printing of the backup reception data stored in the RAM 3 and the indication mark. This is because it can be assumed that external light intrusion into the facsimile device will probably not continue for a long time. That is, it is highly probable that external light will disappear by the end of the reception processes. Then, if the indication marks for all pages are properly detected, the backup reception data is erased from the RAM 3.

Also, if external light is detected by the mark sensor 15 at reception of facsimile data, the printing portion 12 performs printing of the facsimile data and the indication mark for all pages. At the same time, the facsimile data is stored as backup reception data in the RAM 3. Then, once reception of the facsimile data has been completed, the display portion 14 displays on the LCD a message asking the user whether or not printing was properly performed. If the user indicates that printing was properly performed, then the backup reception data is erased from the RAM 3. On the other hand, if the user indicates that the printing was not properly performed, then the backup reception data stored in the RAM 3 is maintained in the RAM 3 without being erased.

Next, an explanation will be provided for these situation when the mark flag is ON, that is, has a value set to 1, and that the backup flag is OFF, that is, has a value set to 0. In this case, if no external light is detected by the mark sensor 15 at reception of facsimile data, then the printing portion 12 performs printing of one page's worth of the facsimile data and the indication mark. Then, the mark sensor 15 detects the indication mark. If the mark sensor 15 properly detects the indication mark, then the same processes are repeated while the mark sensor 15 detects whether or not external light is present in the facsimile device. This continues until a final page is printed out.

On the other hand, if the indication mark cannot be properly detected on a specific page while no external light is detected within the facsimile device, it is determined that the ink passages are clogged. Then, the facsimile device is switched to its memory reception mode starting from the specific page on which the indication mark in question was printed. That is, facsimile data for the present and subsequent pages is stored as backup reception data in the RAM 3 without the printing portion 12 performing printing of the facsimile data.

Then, after reception of the facsimile data is completed, the display portion 14 displays on the LCD a message informing the user that the ink passages for black ink are clogged and that the ink passages need to be cleaned. After the user operates predetermined key switches to input a command for cleaning of the ink passages, cleaning processes are executed accordingly. Then, the printing portion 12 automatically performs printing of the backup reception data and the indication mark. If the indication mark is properly detected for every page, then the backup reception data is erased from the RAM 3. If the indication mark for any page is not properly detected, the display portion 14 displays on the LCD a message asking the user whether or not printing has been properly performed. If the user indicates that printing has been properly performed, then the backup reception data is deleted from the RAM 3. The user can indicate proper printing by operating certain key switches.

If external light is detected during printing of the facsimile data, the printing portion 12 continues printing until the final page is printed out. However, the mark sensor 15 does not attempt to detect the indication marks. Also, the RAM 3 does not store the facsimile data as backup reception data.

If external light is detected at reception of facsimile data, the printing portion 12 performs printing of the facsimile data and the indication mark for all pages. However, the mark sensor 15 does not attempt to detect the indication marks. Also, the received facsimile data is not backed up.

Next, an explanation will be provided for situation for when the mark flag is OFF, that is, has a value set to 0, and the backup flag is ON, that is, has a value set to 1. In this case, the mark sensor 15 does not attempt to detect external light. That is, regardless of whether or not external light is intruding into the facsimile device, the printing portion 12 performs printing of the facsimile data for all pages. At the same time, the facsimile data is stored as backup reception data in the RAM 3. In this case, no indication mark is printed on any page. Then, when reception of the facsimile data is completed, a message is displayed on the LCD to ask the user whether or not printing was properly performed. If the user indicates that the printing was properly performed, then the backup reception data is erased from the RAM 3. On the other hand, if the user indicates that the printing was not properly performed, then the backup reception data is retained in the RAM 3 without being erased.

Next, an explanation will be provided for the situation when both the mark flag and the backup flag are OFF, that is, have values set to 0. In this case, the printing portion 12 performs printing of facsimile data for all pages regardless of whether or not external light is intruding into the facsimile device. In this case, no indication mark is printed, and no facsimile data is backed up.

Next, a detailed explanation of the above-described operations will be provided. The operations include a reception routine, a first routine, a second routine, a third routine, a fourth routine, a voice signal routine, a printing results inquiry routine, an ink clog routine, an ink empty routine, a post cleaning routine, and a manual erasure routine. It should be noted that all operations are performed under the control of the CPU 1.

Figure 2:
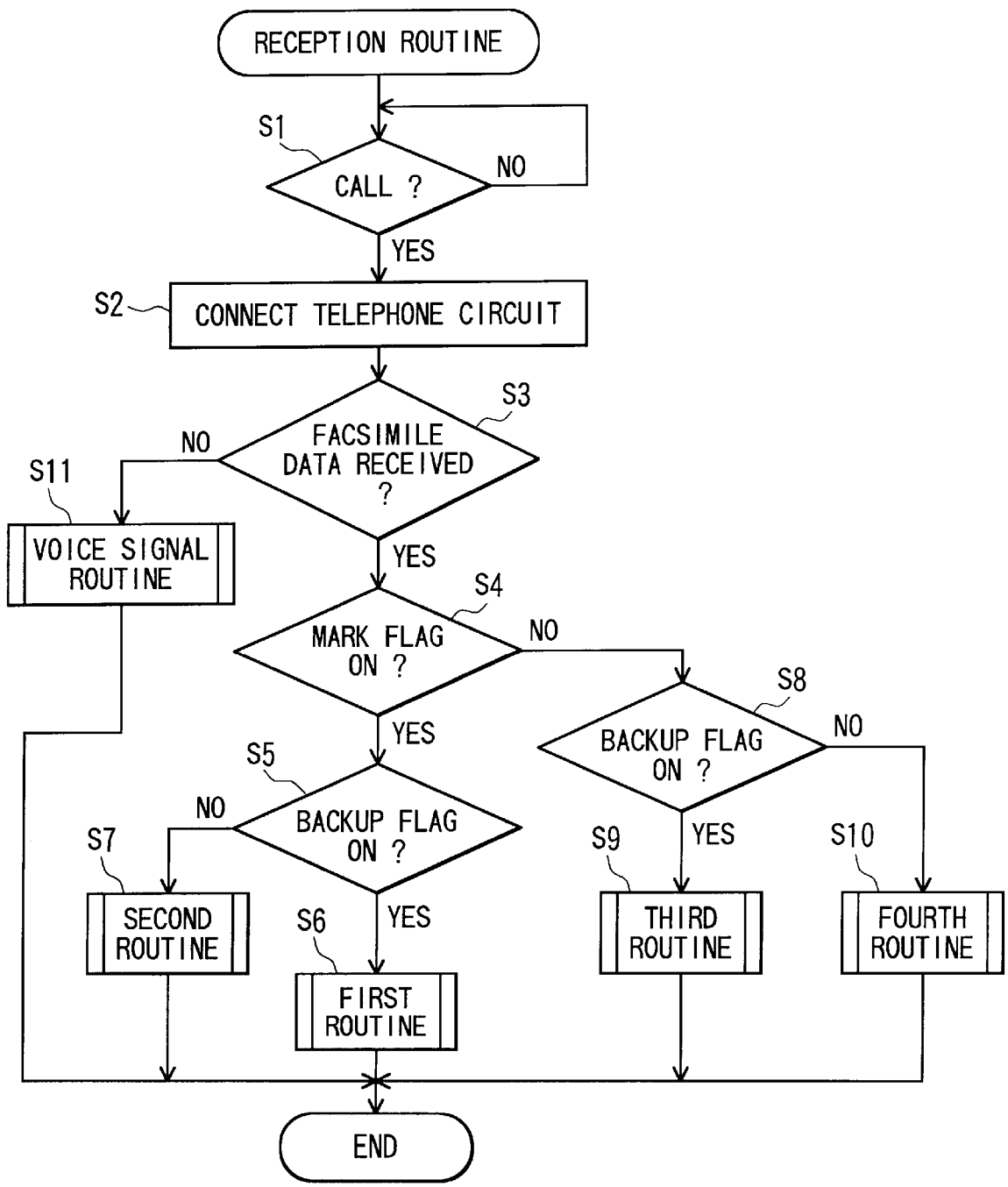
FIG. 2 is a flowchart representing a reception routine of the facsimile device shown in FIG. 1.

First, the reception routine will be described while referring to the flowchart shown in FIG. 2. First, the CPU 1 determines in S1 whether or not a call signal has been received. In particular, by observing the NCU 2, the CPU 1 investigates whether or not any call signal has been inputted from a telephone exchange system (not shown) over the telephone circuit 21.

If a call signal has been received (S1:YES), then in S2, the NCU 2 connects the telephone circuit 21. As a result, the call signal is inputted into the modem 4 via the telephone circuit 21 and the NCU 2. Then, the modem 4 demodulates the call signal into reception data. Then, the CPU 1 determines in S3 whether or not the reception data is facsimile data.

If so (S3:YES), the CPU 1 determines in S4 whether or not the mark flag is ON. In particular, the CPU 1 retrieves the mark flag from the EEPROM 6 and investigates whether or not the value of the mark flag is 1.

If so (S4:YES), then the CPU 1 determines in S5 whether or not the backup flag is ON. In particular, the CPU 1 retrieves the backup flag from the EEPROM 6 and investigates whether or not the value of the backup flag is 1.

If the backup flag is ON (S5:YES), then, the CPU 1 executes the first routine in S6, and the present routine is ended. Details of the first routine will be described later.

On the other hand, if the backup flag is not ON (S5:NO), then in S7, the CPU 1 executes the second routine, whereupon this routine is ended. Details of the second routine will be described later.

If it is determined in S4 that the mark flag is not ON (S4:NO), the CPU 1 further determines in S8 whether or not the backup flag is ON.

If so (S8:YES), then the CPU 1 performs the third routine in S9, whereupon the present routine is ended. Details of the third routine will be described later.

On the other hand, if the backup flag is not ON (S8:NO), then in S10, the CPU 1 performs the fourth routine, then, the present routine is ended. Details of the fourth routine will be described later.

If it is determined in S3 that the reception data is not facsimile data (S3:NO), then the CPU 1 determines that the reception data is voice data. The CPU 1 executes in S11 the voice data routine, whereupon the present routine is ended. Specifically, when the facsimile device is in its answering machine mode, the response message data prestored in the RAM 3 is retrieved and converted into an analog voice signal by the codec 8. Then, the analog voice signal is outputted over the NCU 2 to the telephone circuit 21. Also, the call signal inputted to the NCU 2 over the telephone line 21 is converted into digital voice data by the codec 8 and stored in the RAM 3. Because processes for voice data routine are well known, detailed explanation will be omitted.

If in S1 no call signal is received (S1:NO), S1 is repeated until a call signal is received.

Figure 3:
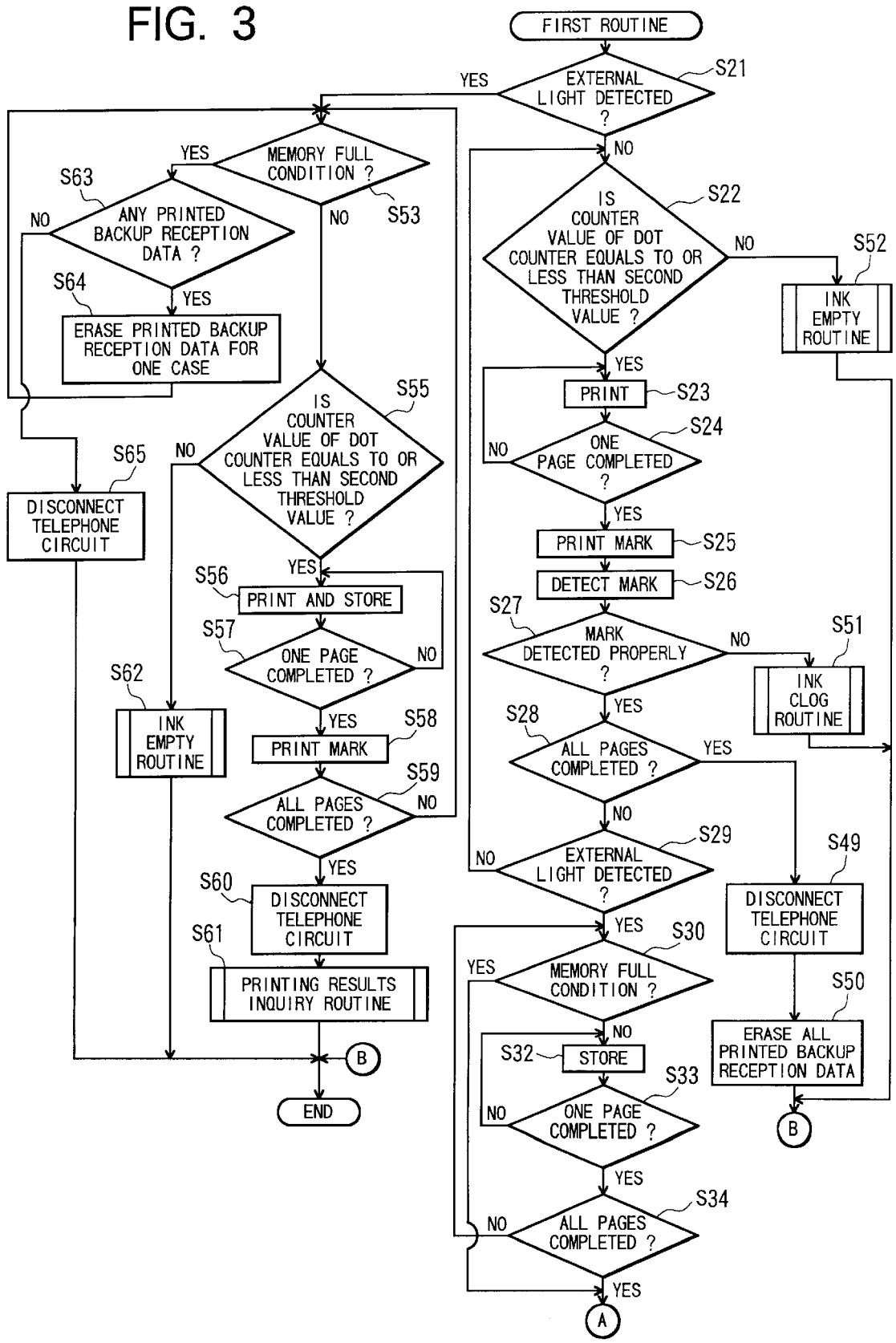
FIG. 3 is a flowchart representing a portion of a first routine of the facsimile device shown in FIG. 1.
Figure 4:
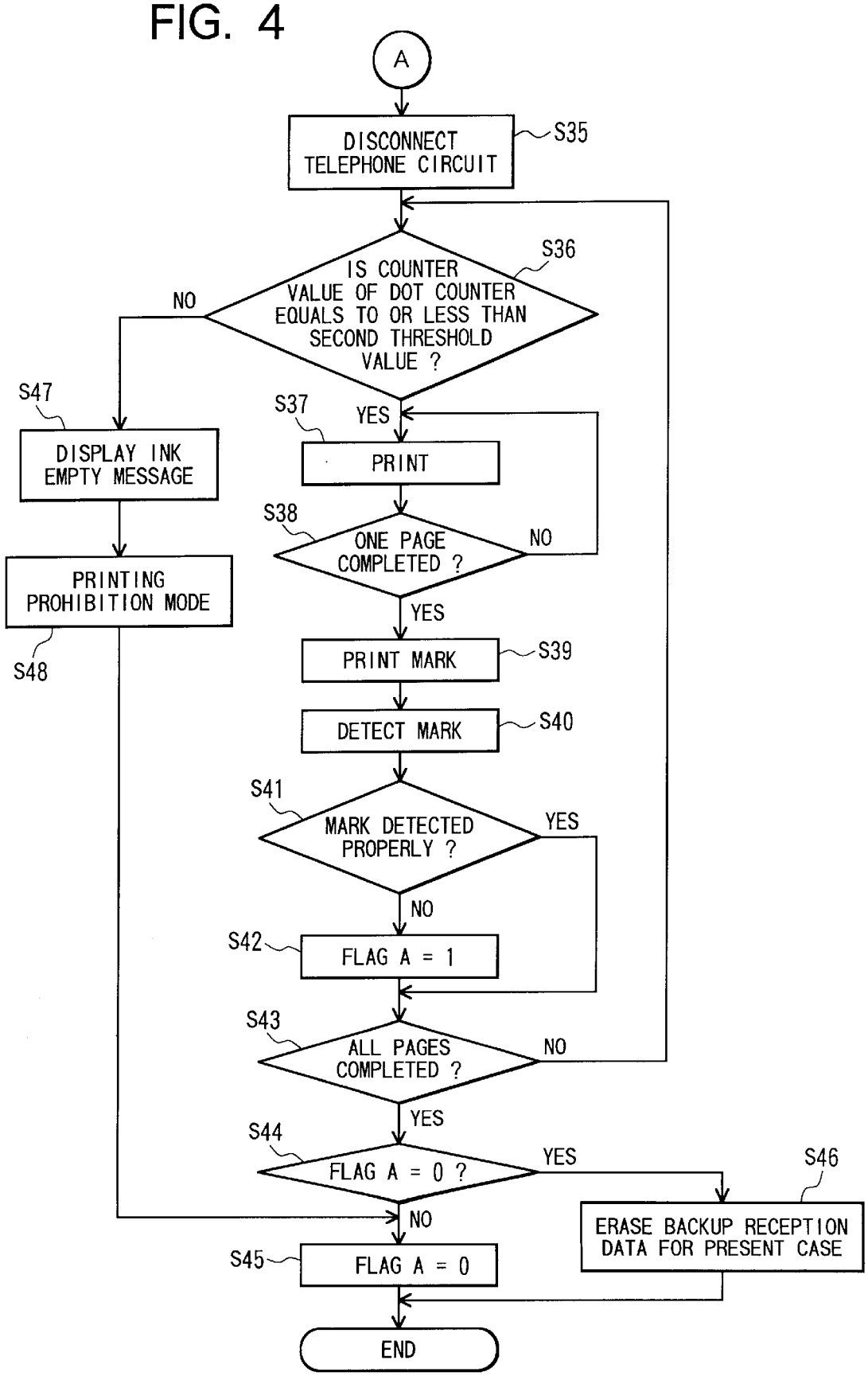
FIG. 4 is a flowchart representing a remaining portion of the first routine shown in FIG. 3.

Next, the first routine will be described while referring to the flowcharts shown in FIGS. 3 and 4. The first routine is executed in S6 of FIG. 2, that is, when both the mark flag and the backup flag are ON. First, the CPU 1 determines in S21 whether or not external light is invading into the facsimile device. In particular, the CPU 1 observes a light detection signal outputted from the mark sensor 15 under a condition wherein no recording sheet is positioned at the mark detecting position and also the light source of the mark sensor 15 is OFF. The CPU 1 determines whether or not the value of the light detection signal exceeds a predetermined light value.

If it is determined that external light is not invading into the facsimile device, that is, no external light is detected within the facsimile device (S21:NO), then the CPU 1 determines in S22 whether or not a count value of the dot counter is equal to or less than a predetermined second threshold value. In particular, the CPU 1 retrieves the count value of the dot counter for black ink, and investigates whether or not the count value is equal to or less than the second threshold value.

It should be noted that the CPU 1 observes facsimile data inputted to the printing portion 12 and calculates an accumulated number of dots printed in each different colored ink based on the facsimile data. The obtained value is stored as the count value of the dot counter. The count value of the dot counter is automatically reset each time the ink cartridge or print head is replaced.

A first threshold value and the second threshold value are predetermined count values, wherein the second threshold value is set larger than the first threshold value. The first and second threshold values are used as references for the dot counter. For example, when the count value for black ink exceeds the first threshold value, the printing portion 12 displays on the LCD a message informing the user that only a small amount of black ink remains in the ink tank. Also, when the count value reaches or exceeds the second threshold value, then the printing portion 12 displays on the LCD an ink empty message informing the user that black ink has run out. At the same time, the facsimile device is set to its printing prohibition mode with respect to black ink. Detailed explanation of the printing prohibition mode will be provided later.

If the counter value of the dot counter is equal to or less than the second threshold value (S22:YES), then in S23 the printing portion 12 performs printing of one band's worth of the facsimile data. In particular, the facsimile data, which has been demodulated by the modem 4 and decoded by the codec 8, is outputted over the gate array 7 to the printing portion 12. Then, the printing portion 12 performs printing of one band's worth of the facsimile data using black ink. It should be noted that one band's worth of the facsimile data is equivalent to the width of in an auxiliary scanning direction of an image printed by the print head during a single sweep in the main scanning direction.

Then, the CPU 1 determines in S24 whether or not printing of one page's worth of the facsimile data has been completed.

If so (S24:YES), then in S25 the printing portion 12 prints an indication mark at the predetermined position on the recording sheet. Then, the mark sensor 15 detects in S26 the indication mark at the mark detecting position. In particular, when the indication mark is brought into the mark detecting position as the feeding mechanism feeds the recording sheet, the mark sensor 15 detects the indication mark. Based on detection results, the mark sensor 15 outputs a mark detection signal over the gate array 7. Then in S27, the CPU 1 observes the mark detection signal to determine whether or not the indication mark could be properly detected. In particular, the CPU 1 determines whether or not a value of the mark detection signal is less than a predetermined mark value.

If the indication mark is properly detected (S27:YES), then the CPU 1 determines in S28 whether or not printing of the facsimile data has been completed for all pages.

If not (S28:NO), this means that printing of the facsimile data for another page still needs to be performed, so in S29, the CPU 1 again determines whether or not external light is present in the facsimile device.

If external light is present in the facsimile device (S29:YES), then the CPU 1 determines in S30 whether or not the RAM 3 is in a memory full condition, that is, whether or not the RAM 3 has the empty memory capacity less than a predetermined memory value.

If the RAM 3 is not in the memory full condition (S30:NO), then in S32, the facsimile data is stored as backup reception data in the RAM 3. In particular, the DMAC 9 stores the facsimile data, which has been demodulated by the modem 4 and decoded by the codec 8, a predetermined number of bits at a time in the RAM 3. That is, if external light intrudes into the facsimile device during reception of facsimile data, the facsimile device is switched to its memory reception mode from the present page, and facsimile data for the present and subsequent pages is stored as backup reception data in the RAM 3. It should be noted that when facsimile data is stored as backup reception data, transmission maintenance information data relating to the facsimile data is also stored in a predetermined region of the RAM 3.

Then, the CPU 1 determines in S33 whether or not storing of a single page's worth of the facsimile data as backup reception data in the RAM 3 has been completed.

If so (S33:YES), then in S34, the CPU 1 determines whether or not the facsimile data for all pages has been stored in the RAM 3.

If so (S34:YES), then in S35, the NCU 2 disconnects the telephone circuit 21. Then, the CPU 1 determines in S36 whether or not the count value of the dot counter is equal to or less than the second threshold value. If so (S36:YES), then in S37, printing of the backup reception data which has been stored in S32 is performed. In particular, the CPU 1 retrieves the backup reception data from the RAM 3 and supplies the backup reception data to the printing portion 12 over the gate array 7. Then, the printing portion 12 performs printing of one band's worth of the backup reception data.

The CPU 1 determines in S38 whether or not printing of one page's worth of the backup reception data has been completed.

If so (S38:YES), then in S39, the printing portion 12 prints an indication mark at the predetermined position on the recording sheet. Then, the mark sensor 15 detects in S40 the indication mark, and the CPU 1 determines in S41 whether or not the indication mark has been properly detected.

If not (S41:NO), then in S42, the value of the flag A is set to 1. In particular, the CPU 1 reads the flag A from the EEPROM 6. If the value of the flag A is 0, the CPU 1 updates the value of the flag A to 1. On the other hand, if the value of the flag A is already 1, the CPU 1 maintains the value of the flag A as it is. As described above, the flag A indicates whether or not the indication mark could be properly detected during printing of backup reception data.

Then, in S43, the CPU 1 determines whether or not printing of the backup reception data for all pages has been completed.

If so (S43:YES), the CPU 1 determines in S44 whether or not the value of the flag A is 0. If the value is not 0 (S44:NO), then this means that the indication mark could not be properly detected at least one time. Therefore, there is a possibility that printing of the backup reception data has not been properly performed for at least one page. Then, the CPU 1 resets in S45 the value of the flag A to 0 without erasing the backup reception data. Then, this routine is ended.

If it is determined in S44 that the value of the flag A is 0 (S44:YES), then this means that the indication marks for all pages have been properly detected. This indicates that printing of the backup reception data has been properly performed for all pages. Therefore, in S46, the backup reception data is erased from the buffer region of the RAM 3, and this routine is ended.

If it is determined in S43 that printing of the backup reception data has not been completed for all pages (S43:NO), the routine returns to S36.

If it is determined in S41 that the indication mark was properly detected (S41:YES), the routine directly proceeds to S43 without executing S42.

If it is determined in S38 that printing of one page's worth of the backup reception data has not been completed (S38:NO), then the routine returns to S37 and continues printing of the backup reception data.

If it is determined in S36 that the count value of the dot counter is not equal to or less than the second threshold value (S36:NO), then in S47, the display portion 14 displays on the LCD the ink empty message notifying the user that the black ink has run out. Then, in S48, the facsimile device is set to its printing prohibition mode, and the routine proceeds to S45. It should be noted that when the facsimile device is in its printing prohibition mode, the facsimile device is set in its memory reception mode wherein received facsimile data is stored as backup reception data in the RAM 3 unless the RAM 3 becomes a memory saturated condition. More specifically, any newly received facsimile data is stored as backup reception data in the RAM. Then, if the RAM 3 becomes in the memory full condition, backup reception data which already has been printed once (hereinafter referred to as "printed backup reception data") is erased from the RAM 3 so that additional new facsimile data can be stored in the RAM 3. Then, if there is no printed backup reception data to be erased, that means the RAM 3 became into the memory saturated condition wherein no further facsimile data can be stored. The printing prohibition mode is automatically canceled when the ink clog routine is automatically performed after user exchanges the black ink cartridges.

If it is determined in S34 that storing of the facsimile data for all pages has not been completed (S34:NO), the routine returns to S30.

If it is determined in S33 that storing of all pages' worth of the facsimile data has not been completed yet (S33:NO), the routine returns to S32 wherein storing of the facsimile data is continued.

If, in S30, the RAM 3 is in the memory full condition (S30:YES), then the routine proceeds directly to S35.

If, in S29, no external light is detected within the facsimile device (S29:NO), then the routine returns to S22.

If, in S28, it is determined that printing of the facsimile data for all pages has been completed (S28:YES), then the routine proceeds to S49 wherein the NCU 2 disconnects the telephone circuit 21. Then, in S50, the CPU 1 deletes all printed backup reception data, and this routine is ended. In particular, the CPU 1 retrieves information relating to backup reception data from the RAM 3, and determines whether or not printing of the backup data has been completed. If so, the backup reception data is erased from the RAM 3.

If it is determined in S27 that the indication mark could not be properly detected (S27:NO), this indicates that the ink passages are probably clogged with ink because no external light is present in the facsimile device so external light is not the reason for the indication mark not being properly detected. Therefore, in S51, the CPU 1 executes the ink clog routine, and this routine is ended. Details of the ink clog routine will be described later.

If it is determined in S24 that printing of a single page's worth of facsimile data has not been completed (S24:NO), then the routine returns to S23.

If it is determined in S22 that the count value of the dot counter is not equal to or less than the second threshold value (S22:NO), this means that black ink has run out. Therefore, the CPU 1 executes the ink empty routine in S52, and this routine is ended. Details of the ink empty routine will be described later.

If it is determined in S21 that external light is present in the facsimile device (S21:YES), then, the CPU 1 determines in S53 whether or not the RAM 3 is in the memory full condition.

If not (S53:NO), then in S55, the CPU 1 determines whether or not the count value of the dot counter is equal to or less than the second threshold value.

If so (S55:YES), then in S56, printing of the facsimile data is performed, and simultaneously the facsimile data is stored as backup reception data in the RAM 3. In particular, the CPU 1 supplies the facsimile data, which has been demodulated by the modem 4 and decoded by the codec 8, to the printing portion 12 over the gate array 7. The printing port ion 12 performs printing of one band's worth of the facsimile data. Also, the CPU 1 controls the DMAC 9 to store the facsimile data a predetermined number of bits at a time in the RAM 3. Then, in S57, the CPU 1 determines whether or not printing and storing of one page's worth of the facsimile data have been completed.

If so (S57:YES), then in S58, the printing portion 12 prints an indication mark at the predetermined position on the recording sheet. Further, the CPU 1 determines in S59 whether or not printing and storing of the facsimile data for all pages has been completed.

If so (S59:YES), then in S60, the telephone circuit 21 is disconnected. Then, in S61, the CPU 1 performs the printing results inquiry routine, and this routine is ended. Details of the printing results inquiry routine will be described later.

If it is determined in S59 that printing and storing of the facsimile data for all pages have not been completed yet (S59:NO), this means that printing and storing of the facsimile data have to be still performed so the routine returns to S53.

If it is determined in S57 that printing and storing of one page's worth of the facsimile data have not been completed (S57:NO), the routine returns to S56.

If it is determined in S55 that the count value of the dot counter is not equal to or less than the second threshold value (S55:NO), this means that black ink has run out. The CPU 1 performs in S62 the ink empty routine, and this routine is ended. Details of the ink empty routine will be described later.

If it is determined in S53 that the RAM 3 is in the memory full condition (S53:YES), then in S63, the CPU 1 determines whether or not any printed backup reception data is present in the RAM 3. If so (S63:YES), the CPU 1 erases in S64 one case's worth of the printed backup reception data from the RAM 3, and the routine returns to S53. If it is determined in S63 that no printed backup reception data is stored in the RAM 3 (S63:NO), then in S65, the NCU 2 disconnects the telephone circuit 21, and this routine is ended.

As described above, when both the mark flag and the backup flag are ON, if no external light is detected in the facsimile device at reception of facsimile data, the printing portion 12 performs printing of the facsimile data and an indication mark while the CPU 1 confirms that the indication mark is properly detected. Then, if the indication mark could be properly detected on every page, it is determined that the ink passages are not clogged. Then, any printed backup reception data stored in the RAM 3 is erased.

Also, if the indication mark cannot be properly detected even when no external light is intruding into the facsimile device, this means that the ink passages are probably clogged with ink so the facsimile device is switched to the memory reception mode.

If external light is detected during printing of the facsimile data, the facsimile device is switched to the memory reception mode wherein the facsimile data is stored as backup reception data in the RAM 3. Then, after reception of the facsimile data is completed, printing of backup reception data is automatically performed. The reason for this is that it can be assumed that external light intruding into the facsimile device will probably not continue for a long time. It is highly probable that external light will disappear by the end of the reception processes.

Further, if external light is detected at reception of facsimile data, printing of the facsimile data is performed for all pages, and also, the facsimile data is stored as backup reception data in the RAM 3. The reason for this is that the indication mark cannot be properly detected in the presence of external light even if the indication mark is properly printed.

Figure 5:
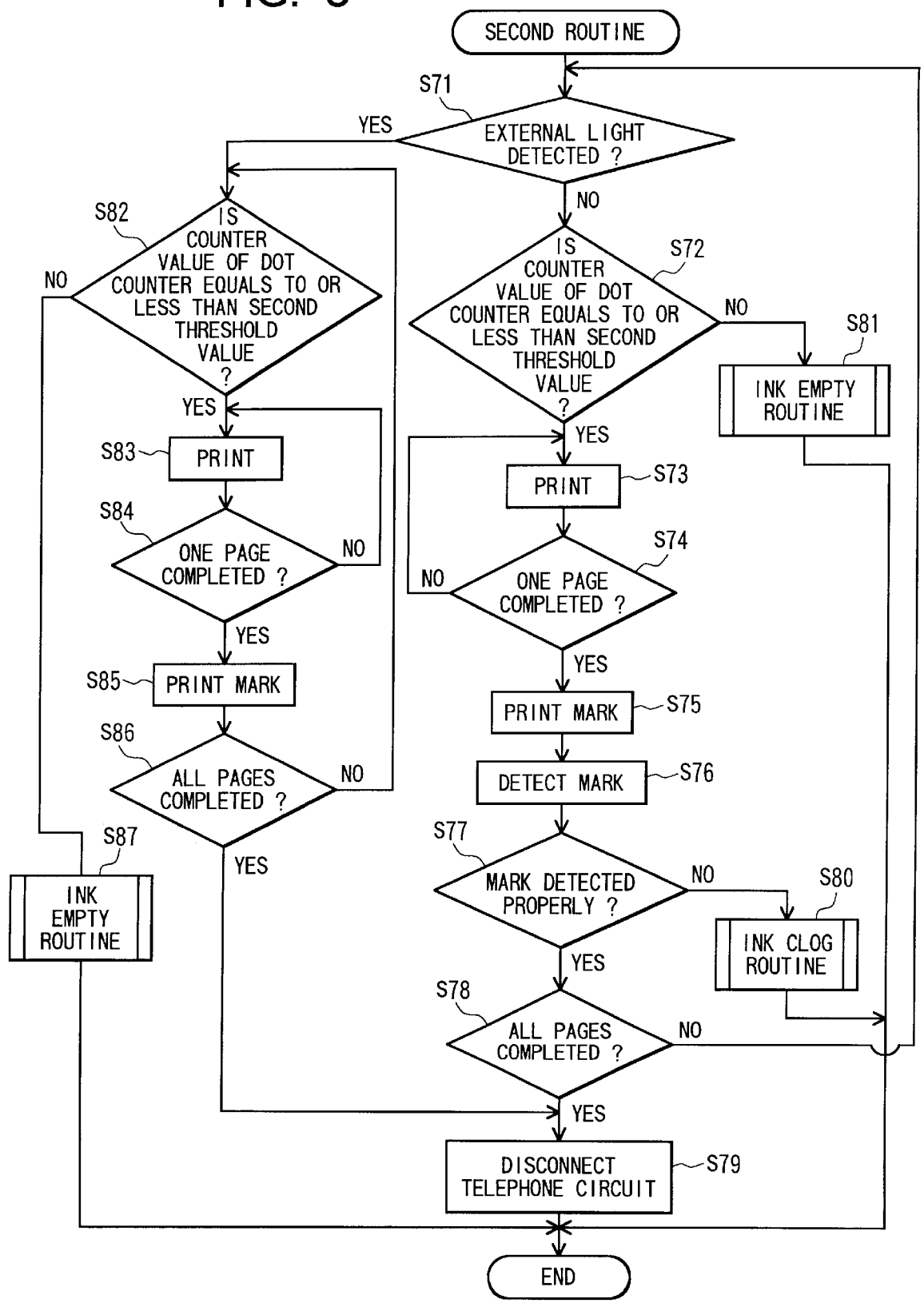
FIG. 5 is a flowchart representing a second routine of the facsimile device shown in FIG. 1.

Next, the second routine will be described while referring to the flowchart shown in FIG. 5. The second routine is executed in S7 of FIG. 2, that is, when the mark flag is ON and the backup flag is OFF. When the second routine is started, first, the CPU 1 determines in S71 whether or not external light is intruding into the facsimile device.

If not (S71:NO), then in S72, the CPU 1 determines whether or not the count value of the dot counter is equal to or less than the second threshold value.

If so (S72:YES), then in S73 the printing portion 12 performs printing of one band's worth of the facsimile data. Then, the CPU 1 determines in S74 whether or not printing of one page's worth of the facsimile data has been completed.

If so (S74:YES), then in S75, the printing portion 12 performs printing of an indication mark at the predetermined position on the recording sheet. Then in S76, the mark sensor 15 detects the indication mark. The CPU 1 determines in S77 whether or not the indication mark could be properly detected.

If the indication mark could be properly detected (S77:YES), then in S78, the CPU 1 determines whether or not printing of the facsimile data has been completed for all pages.

If so (S78:YES), the telephone circuit 21 is disconnected in S72, and this routine is ended.

If it is determined in S78 that printing of the facsimile data has not been completed for all pages (S78:NO), the routine returns to S71.

If it is determined in S77 that the indication mark could not be properly detected (S77:NO), then in S80, the CPU 1 executes the ink clog routine, and this routine is ended. The details of the ink clog routine will be described later.

If it is determined in S74 that printing of one page's worth of the facsimile data has not been completed (S74:NO), then, the routine returns to S73.

If it is determined in S72 that the count value of the dot counter is not equal to or less than the second threshold value (S72:NO), this means that black ink has run out. Then, the CPU 1 executes in S81 the ink empty routine, and this routine is ended. Details of the ink empty routine will be described later.

If it is determined in S71 that external light is present in the facsimile device (S71:YES), then in S82 the CPU 1 determines whether or not the count value of the dot counter is equal to or less than the second threshold value.

If so (S82:YES), then in S83 the printing portion 12 performs printing of one band's worth of the facsimile data. Then, the CPU 1 in S84 determines whether or not printing of one page's worth of the facsimile data has been completed.

If so (S84:YES), then in S85 the printing portion 12 prints an indication mark at the predetermined position on the recording sheet. Then, the CPU 1 determines in S86 whether or not printing of the facsimile data has been completed for all pages.

If so (S86:YES), then the routine proceeds to S79 wherein the telephone circuit 21 is disconnected.

If it is determined in S86 that printing of the facsimile data has not been completed for all pages (S86:NO), the routine returns to S82.

If it is determined in S82 that printing of one page's worth of the facsimile data has not been completed (S84:NO), the routine returns to S83.

If it is determined in S82 that the count value of the dot counter is not equal to or less than the second threshold value (S82:NO), then in S87, the CPU 1 executes the ink empty routine, and this routine is ended. Details of the ink empty routine will be described later.

As described above, when the mark flag is ON and the backup flag is OFF, printing of facsimile data is performed without storing the facsimile data regardless of whether or not external light is intruding into the facsimile device. The facsimile device will be switched to the memory reception mode only when an indication mark cannot be properly detected while no external light is detected. This is because the user who sets the backup flag to OFF obviously does not desire to back up facsimile data by storing the facsimile data as backup reception data. This is done to take their desire into consideration.

Figure 6:
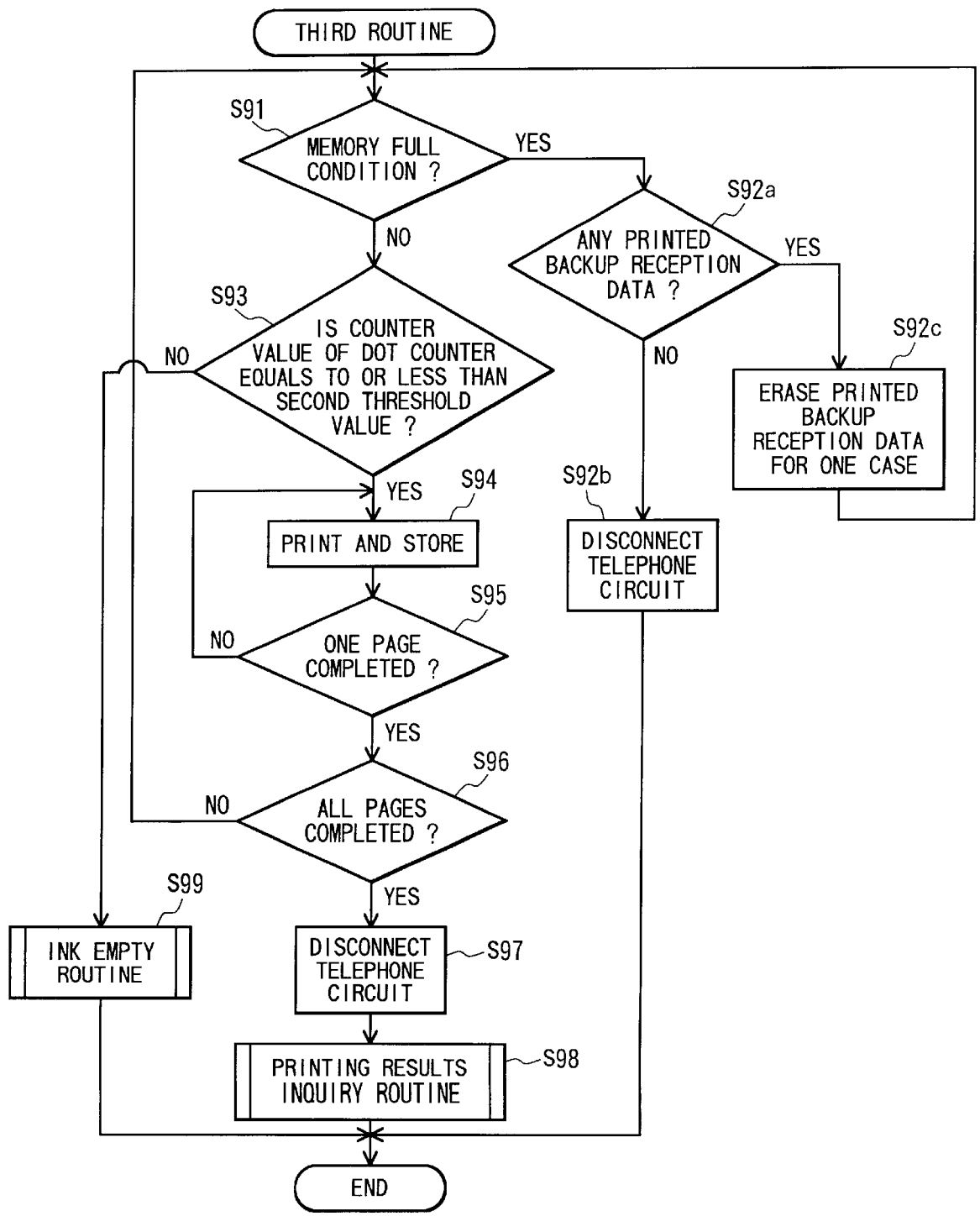
FIG. 6 is a flowchart representing a third routine of the facsimile device shown in FIG. 1.

Next, the third routine will be described while referring to the flowchart shown in FIG. 6. The third routine is executed in S9 of FIG. 2, that is, when the mark flag is OFF and the backup flag is ON. When the third routine is started, first, the CPU 1 determines in S91 whether or not the RAM 3 is in the memory full condition.

If not (S91:NO), the CPU 1 determines in S93 whether or not the count value of the dot counter is equal to or less than the second threshold value.

If so (S93:YES), then in S94, printing and storing of the facsimile data are performed simultaneously. Then, the CPU 1 determines in S95 whether or not both printing and storing of one page's worth of the facsimile data have been completed.

If so (S95:YES), then, the CPU 1 determines in S96 whether or not printing and storing of the facsimile data for all pages have been completed.

If so (S96:YES), then in S97, the telephone circuit 21 is disconnected. Then, the CPU 1 executes in S98 the printing results inquiry routine, and this routine is ended. Details of the printing results inquiry routine will be described later.

If it is determined in S96 that printing and storing of the facsimile data for all pages have not been completed yet (S96:NO), the routine returns to S91.

If it is determined in S95 that printing and storing of one page's worth of the facsimile data have not been completed yet (S95:NO), then the routine returns to S95 and continues printing and storing of the facsimile data.

If it is determined in S93 that the count value of the dot counter is not equal to or less than the second threshold value (S93:NO), this means that black ink has run out. Then, the CPU 1 executes in S99 the ink empty routine, and this routine is ended. Details of the ink empty routine will be described later.

If it is determined in S91 that the RAM 3 is in the memory full condition (S91:YES), then the CPU 1 determines in S92*a* whether or not any printed backup reception data is stored in the RAM 3. If not (S92*a*:NO), then, the telephone circuit 21 is disconnected in S92*b*, and this routine is ended. On the other hand, if there is any printed backup reception data in the RAM 3 (S92*a*:YES), then in S92*c*, the CPU 1 deletes one case's worth of the printed backup reception data from the RAM 3, and the routine returns to S91.

As described above, when the mark flag is OFF and the backup flag is ON, all facsimile data is stored as backup reception data in the RAM 3 regardless of whether or not external light is intruding into the facsimile device. At this time, no indication mark is printed.

Figure 7:
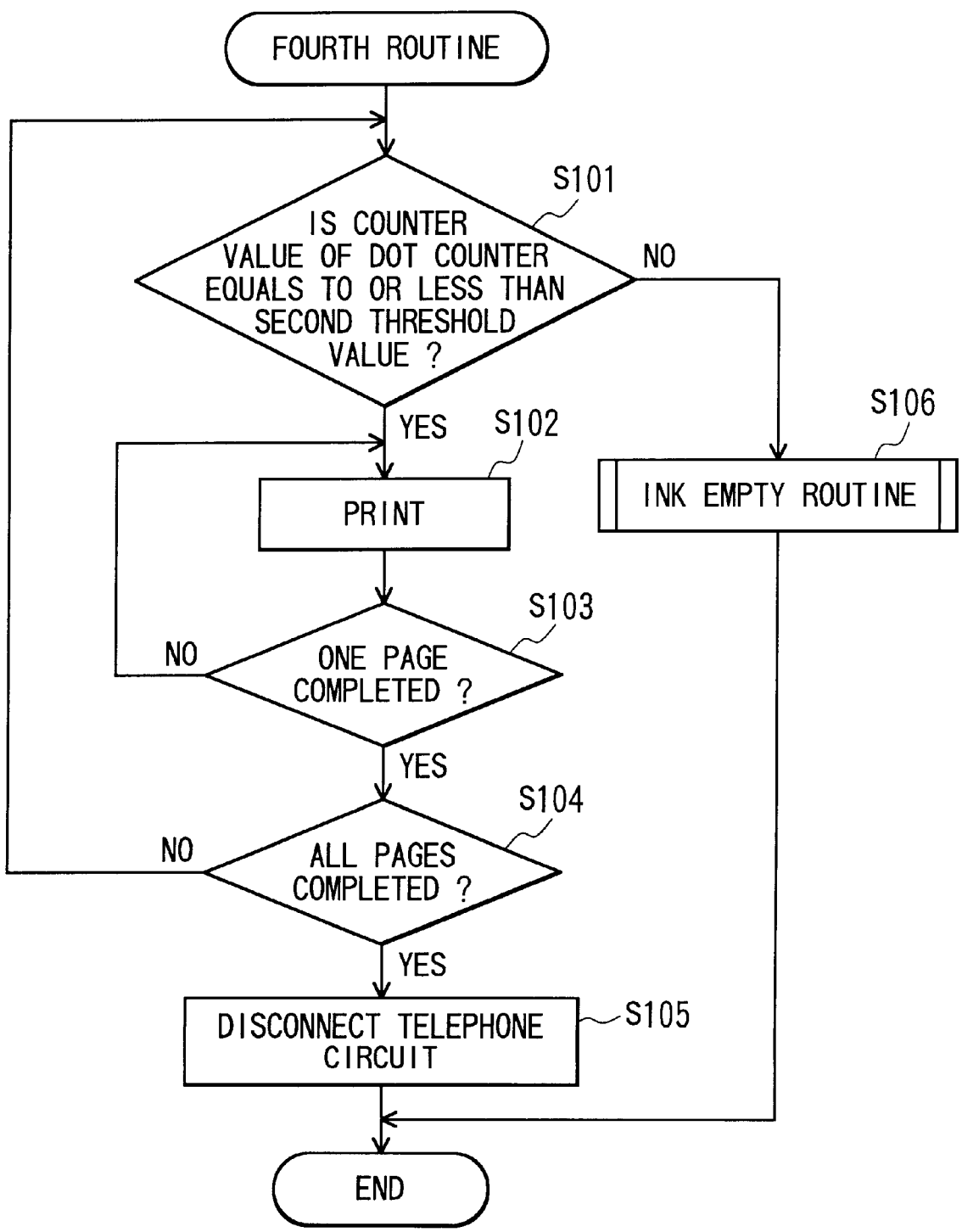
FIG. 7 is a flowchart representing a fourth routine of the facsimile device shown in FIG. 1.

Next, the fourth routine will be described while referring to the flowchart shown in FIG. 7. The fourth routine is executed in S10 of FIG. 2, that is, when both the mark flag and the backup flag are OFF. When the fourth routine is started, first, the CPU 1 determines in S101 whether or not the count value of the dot counter is equal to or less than the second threshold value.

If so (S11:YES), then in S102, the printing portion 12 performs printing of one band's worth of the facsimile data. Then, the CPU 1 determines in S103 whether or not printing of one page's worth of the facsimile data has been completed.

If so (S103:YES), then, the CPU 1 in S104 determines whether or not printing of the facsimile data for all pages has been completed.

If so (S104:YES), then in S105, the telephone circuit 21 is disconnected, and this routine is ended.

If it is determined in S104 that printing of the facsimile data has not been completed for all pages (S104:NO), the routine returns to S101.

If it is determined in S103 that printing of one page's worth of the facsimile data has not been completed (S103:NO), then the routine returns to S103 so that the printing of the facsimile data is continued.

If it is determined in S101 that the count value of the dot counter is not equal to or less than the second threshold value (S101:NO), this means that black ink has run out. The CPU 1 executes in S106 the ink empty routine, and this routine is ended. Details of the ink empty routine will be described later.

As described above, when both the mark flag and the backup flag are OFF, no indication mark is printed and no facsimile data is backed up regardless of whether or not external light is present in the facsimile device.

Figure 8:
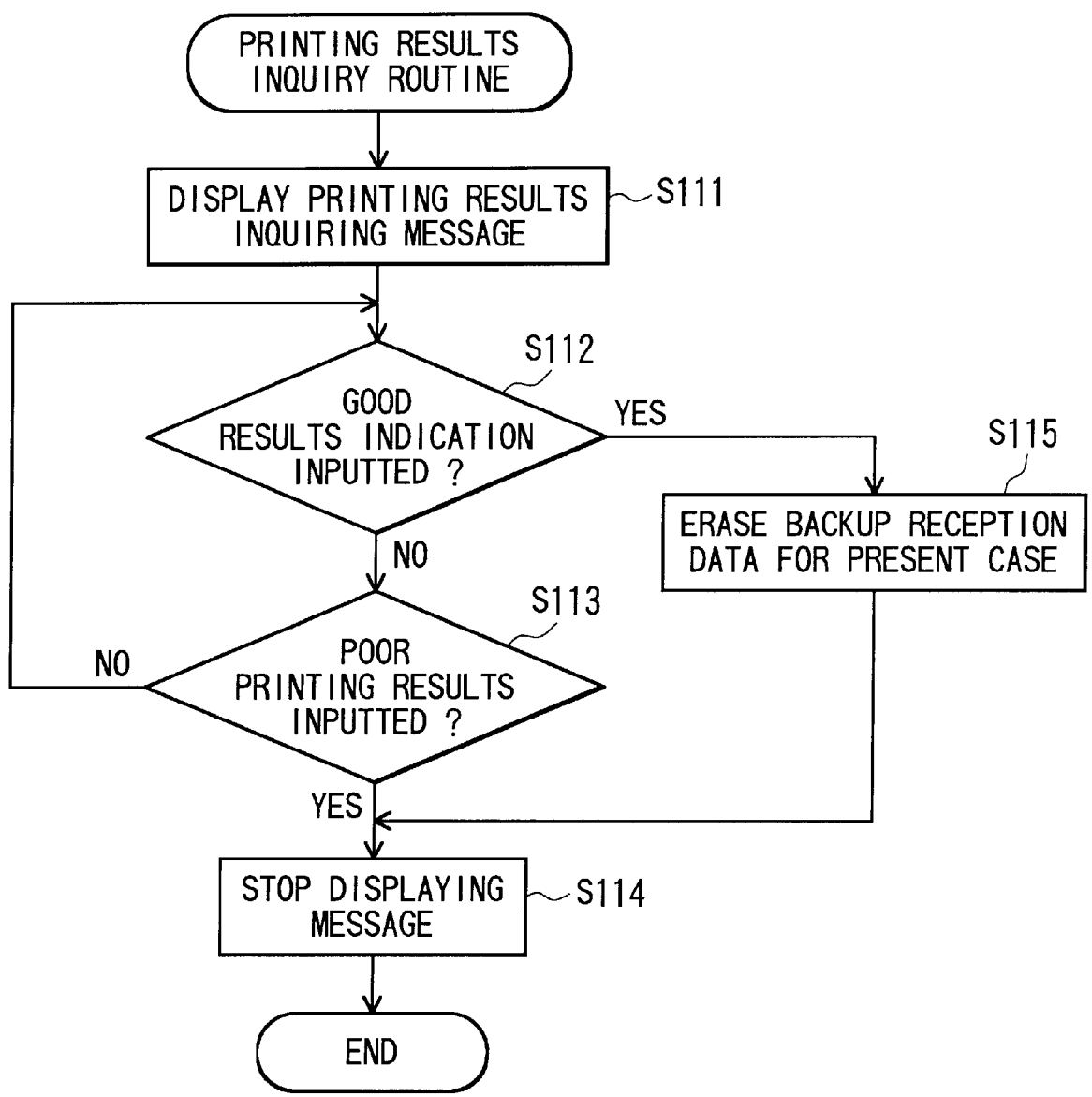
FIG. 8 is a flowchart representing a printing results inquiry routine of the facsimile device shown in FIG. 1.

Next, the printing results inquiry routine will be described while referring to the flowchart shown in FIG. 8. The printing results inquiry routine is executed in S61 of FIG. 3 and in S98 of FIG. 6. When the printing results inquiry routine is started, first in S111, the display portion 14 displays on the LCD a printing results inquiry message asking the user whether or not printing results are good. More specifically, the display portion 14 displays on the LCD a message shown in FIG. 15(a) and a message shown in FIG. 15(b) alternately each time a predetermined time period elapses. The user can examine a printed recording sheet and determine whether the printing results are good or not.

Then, the CPU 1 determines in S112 whether or not the user has indicated that the printing results are good. In particular, when the user presses the No. 1 key of the numeric pad, the operation portion 13 outputs an operation signal accordingly. Then, the CPU 1 observes the operation signal to determine whether the user has pressed the No. 1 key.

If the user does not indicate that the printing results are good (S112:NO), then the CPU 1 determines in S113 whether or not the user has indicated that the printing results are poor. In particular, the CPU 1 observes the operation signal from the operation portion 13 to determine whether or not the user has pressed a No. 2 key.

If the user indicates that the printing results are poor (S113:YES), then in S114, the display portion 14 stops displaying the printing results inquiry messages on the LCD, and this routine is ended.

If in S113 the user does not indicate that the printing results are poor (S113:NO), then the routine returns to S112 and waits for indication from the user.

If in S112 the user indicates that the printing results are good (S112:YES), then in S115, corresponding backup reception data is erased from the RAM 3, and routine proceeds to S114. In particular, the CPU 1 erases the backup reception data which has been stored in the RAM 3 in S56 of FIG. 3 or in S94 of FIG. 6.

As described above, after printing and storing of facsimile data has been completed, the user is asked about quality of printing results. If the printing results are good, corresponding backup reception data is erased from the RAM 3 so that unnecessary backup reception data is not maintained in the RAM 3.

Figure 9:
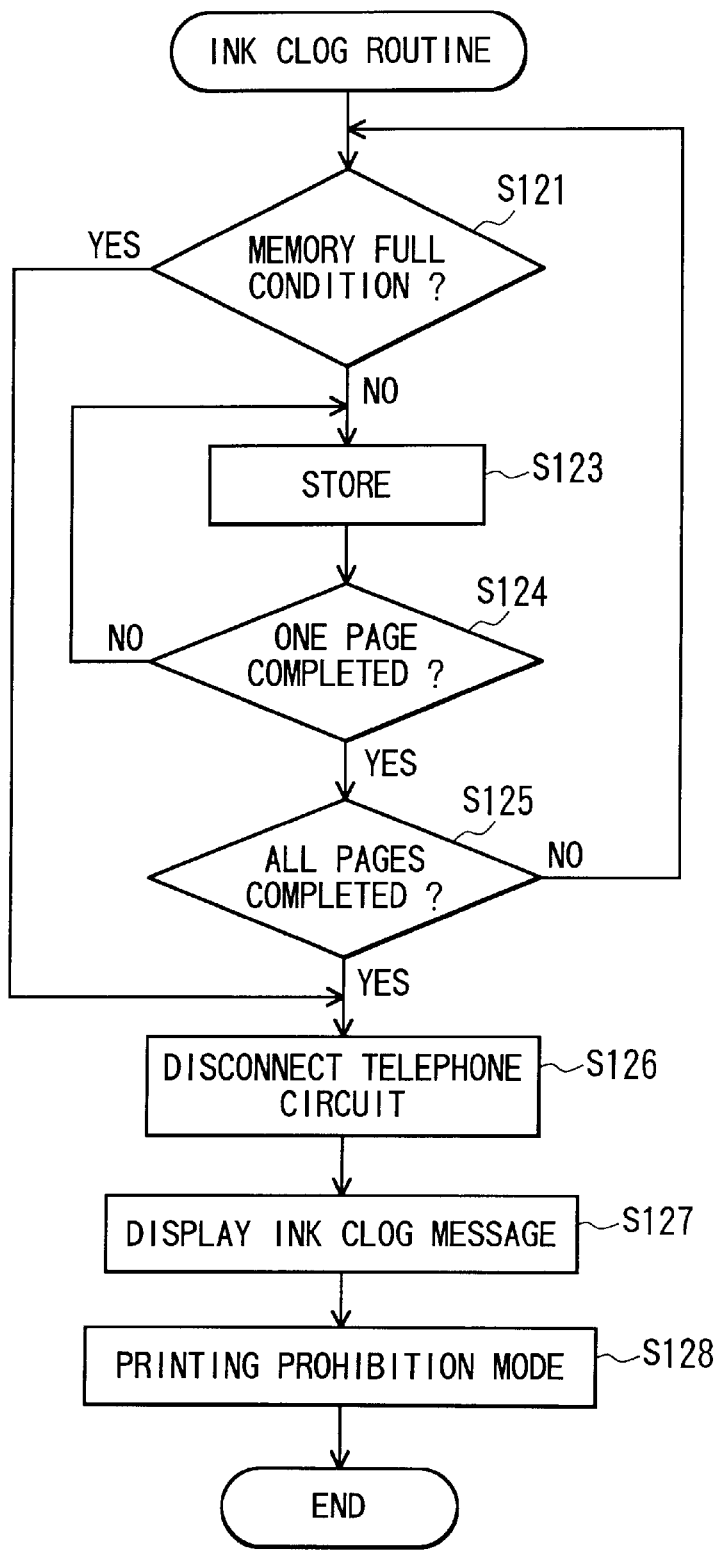
FIG. 9 is a flowchart representing an ink clog routine of the facsimile device shown in FIG. 1.

Next, the ink clog routine will be described while referring to the flowchart shown in FIG. 9. The ink clog routine is executed in S51 of FIG. 3 and in S80 of FIG. 5. When the ink clog routine is started, first, the CPU 1 determines in S121 whether or not the RAM 3 is in the memory full condition.

If not (S121:NO), then in S123 the facsimile data is stored as backup reception data in the RAM 3. In particular, facsimile data for a present page, who's indication mark could not be properly detected, is retrieved from the buffer region of the RAM 3 and stored in the storing region as backup reception data. Then, the facsimile data for subsequent pages which has been demodulated by the modem 4 and decoded by the codec 8 is stored by the DMAC 9 as backup reception data a predetermined number of bits at a time in the RAM 3. That is, when the indication mark cannot be properly detected on a particular page, the ink passages have very likely become clogged during printing of the particular page. Therefore, although the particular page has already been printed out once, the facsimile data for the particular page is stored as backup reception data as well as is the facsimile data for the subsequent pages.

Then, in S124, the CPU 1 determines whether or not one page's worth of the facsimile data has been stored in the RAM 3.

If so (S124:YES), the CPU 1 determines in S125 whether or not storing of the facsimile data for all designate pages has been completed.

If so (S125:YES), then the telephone circuit 21 is disconnected in S126. In particular, the CPU 1 controls the NCU 2 to open the telephone circuit 21. Then in S127, the display portion 14 displays on the LCD an ink clog message informing the user that the ink passages are clogged. Then in S128, the facsimile device is set in the printing prohibition mode, and this routine is ended. When the facsimile device is in the printing prohibition mode, the facsimile device is set to the memory reception mode. Then, if the RAM 3 becomes in the memory saturated condition, reception of additional facsimile data is prohibited. The printing prohibition mode is automatically canceled after the cleaning processes for the black ink passages are performed. The cleaning processes can be performed either automatically at a predetermined timing or whenever the user inputs command for this.

If it is determined in S125 that the facsimile data for all pages has not been stored in the RAM 3 (S125:NO), the routine returns to S121.

If it is determined in S124 that a single page's of the facsimile data has not been stored as backup reception data in the RAM 3 (S124:NO), the routine returns to S123 and continues storing the facsimile data.

If it is determined in S121 that the RAM 3 is in the memory full condition (S121:YES), this means no more facsimile data can be stored in the RAM 3. Therefore, the routine proceeds to S126.

As described above, if the indication mark cannot be properly detected, it is determined that the ink passages for black ink are clogged up. Then, the user is encouraged to execute the cleaning processes for the ink passages.

Figure 10:
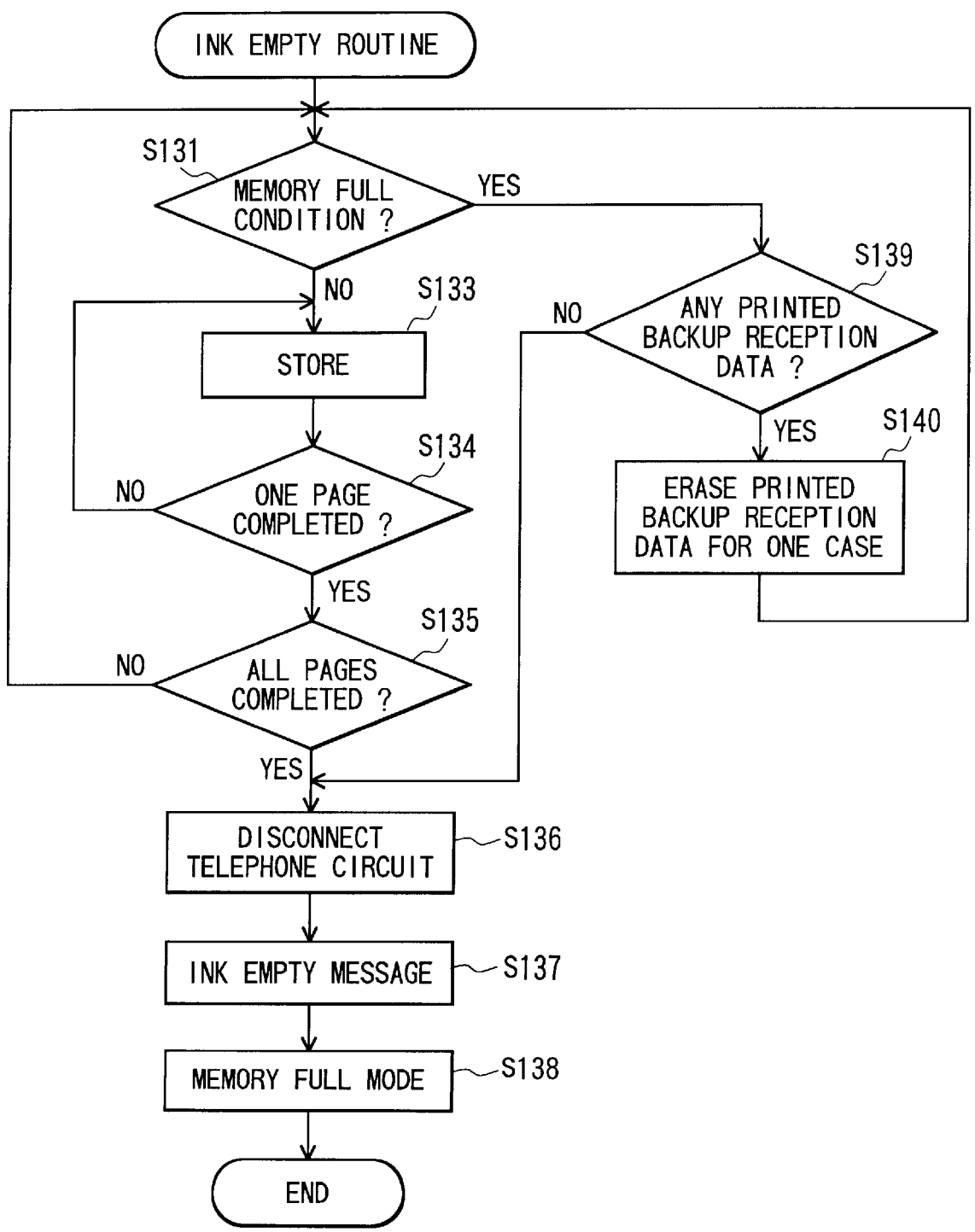
FIG. 10 is a flowchart representing an ink empty routine of the facsimile device shown in FIG. 1.

Next, the ink empty routine will be described while referring to the flowchart shown in FIG. 10. The ink empty routine is executed in S52 and in S62 of FIG. 3, in S81 and in S87 of FIG. 5, in S99 of FIG. 6, and in S106 of FIG. 7. When the ink empty routine is started, first in S131, the CPU 1 determines whether or not the RAM 3 is in the memory full condition.

If not (S131:NO), then in S133, the facsimile data is stored as backup reception data in the RAM 3. Specifically, the DMAC 9 stores the facsimile data, which has been demodulated by the modem 4 and decoded by the codec 8, a predetermined number of bits at a time in the RAM 3. It should be noted that the second threshold value for the dot counter is set so as to provide some leeway before black ink actually runs out. Therefore, even if the count value of the dot counter reaches the second threshold value during printing of a particular page, the particular page can be completely printed out. For this reason, only the facsimile data for subsequent pages is stored in the RAM 3. Then in S134, the CPU 1 determines whether or not a single page's worth of the facsimile data is stored in the RAM 3.

If so (S134:YES), then in S135, the CPU 1 determines whether or not the facsimile data for all pages has been stored in the RAM 3.

If so (S135:YES), then in S136, the CPU 1 controls the NCU 2 to disconnect the telephone circuit 21. Then in S137, the display portion 14 displays on the LCD the ink empty message informing the user that black ink has run out. Then in S138, the facsimile device is set to its memory full mode, and this routine is ended. It should be noted that when the facsimile device is in the memory full mode, the facsimile device is set to the memory reception mode wherein facsimile data is stored in the RAM 3 until the RAM 3 becomes the memory saturated condition. The memory full mode is canceled once cleaning processes are automatically executed after the user exchanges ink cartridges.

If it is determined in S135 that storing of the facsimile data has not been completed for all pages (S135:NO), the routine returns to S131.

If it is determined in S134 that a single page's worth of the facsimile data has not been stored in the RAM 3 (S134:NO), then the routine returns to S133 and continues storing.

If it is determined in S131 that the RAM 3 is in the memory full condition (S131:YES), then in S139, the CPU 1 determines whether or not any printed backup reception data is stored in the RAM 3. If so (S139:YES), then in S140, the CPU 1 erases one case's worth of the printed backup reception data from the RAM 3, and the routine returns to S131. On the other hand, if there is no printed backup reception data in the RAM 3 (S139:NO), then the routine proceeds to S136.

As described above, if the count value of the dot counter reaches the second threshold value, it is determined that black ink has run out. Then, the user is encouraged to replace the ink cartridge.

Figure 11:
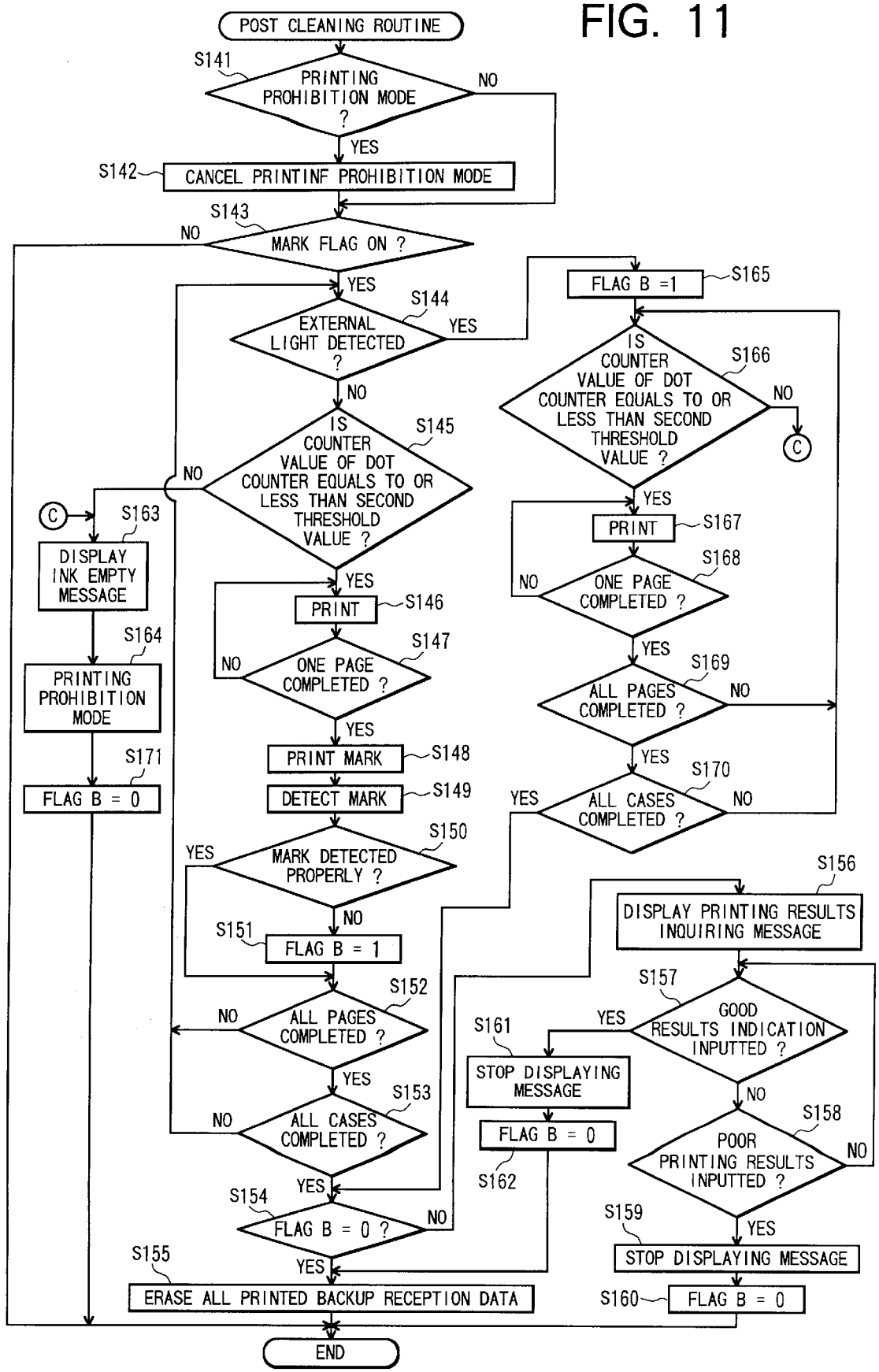
FIG. 11 is a flowchart representing a post-cleaning routine of the facsimile device shown in FIG. 1.

Next, the post cleaning routine will be described while referring to the flowchart shown in FIG. 11. The post cleaning routine is automatically executed after the cleaning processes are performed. The cleaning processes are executed whenever the user desires. The cleaning processes are also automatically performed when ink cartridges are exchanged or at a predetermined timing, that is, every time a predetermined time duration elapses while the power source of the facsimile device is ON. When the post cleaning routine is started, the CPU 1 determines in S141 whether or not the facsimile device is in the printing prohibition mode.

If so (S141:YES), then in S142, the CPU 1 releases the facsimile device from the printing prohibition mode. Then in S143, the CPU 1 determines whether or not the mark flag is ON. In particular, the CPU 1 retrieves the mark flag from the predetermined region in the EEPROM 6 and investigates whether the mark flag has a value set to 1 or not.

If mark flag is ON (S143:YES), then, the CPU 1 determines in S144 whether or not external light is present in the facsimile device. In particular, the CPU 1 observes a detection signal from the mark sensor 15 under conditions wherein no recording sheet is positioned at the mark detecting position and also wherein the light source of the mark sensor 15 is OFF. Then, the CPU 1 determines whether or not the mark detection signal from the mark sensor 15 exceeds the predetermined light value.

If no external light is detected (S144:NO), then in S145, the CPU 1 determines whether or not the count value of the dot counter is equal to or less than the second threshold value.

If so (S145:YES), then in S146, printing of one band's worth of the facsimile data is performed.

Then, the CPU 1 determines in S147 whether or not printing of a single page's worth of the facsimile data has been completed.

If so (S147:YES), then in S148, the printing portion 12 prints an indication mark at the predetermined position on the recording sheet. Then in S149, the mark sensor 15 detects the indication mark. The CPU 1 determines in S150 whether or not the indication mark could be properly detected.

If indication mark could not be properly detected (S150:NO), and in S151, the value of the flag B is set to 1. In particular, the flag B is retrieved from the predetermined region in the EEPROM 6. If the value of the flag B is 0, the value of the flag B is changed to 1. On the other hand, if the value of the flag B is already 1, the value of the flag B is remained as it is. As described above, the flag B represents whether or not an indication mark could be properly detected during printing of backup reception data. Then in S152, the CPU 1 determines whether or not printing of the backup reception data has been completed for all pages for a present case.

It so (S152:YES), the CPU 1 determined in S153 whether or not printing of the backup reception data has been completed for all cases.

If so (S153:YES), then in S154, the CPU 1 determines whether or not the value of the flag B is 0, that is, whether or not the indication mark could be properly detected on every page of every case. If so (S154:YES), it can be assumed that printing of the backup reception data for all cases has been properly performed. Then in S155, all backup reception data is erased from the RAM 3, and this routine is ended.

If it is determined in S154 that the value of the flag B is not 0 (S154:NO), then there is a danger that printing of backup reception data could not be properly performed for at least one page. Then in S156, the display portion 14 displays on the LCD the printing results inquiry message asking the user whether or not printing results are good. More specifically, the display portion 14 displays on the LCD the message shown in FIG. 15(a) and the message shown in FIG. 15(b) alternately each time the predetermined time period elapses. The user can exam the printed recording sheet and determine whether the printing results are good or not.

Then, the CPU 1 determines in S157 whether or not the user has indicated that the printing results were good. In particular, the user manipulates a predetermined key of the numeric pad in order to indicate quality of the printing results, whereupon the operation portion 13 outputs an operation signal accordingly. Then, the CPU 1 observes the operation signal to investigate whether or not the user had pressed the No. 1 key.

If the user does not indicate that the printing results are good (S157:NO), then the CPU 1 determines in S158 whether or not the user has indicated that the printing results were poor. In particular, the CPU 1 observes the operation signal from the operation portion 13 and investigates whether or not the user has pressed the No. 2 key.

If the user indicates that the printing results are poor (S158:YES), then in S159, the display portion 14 stops displaying the printing results inquiry messages on the LCD. Then, the value of the flag B is reset to 0, and this routine is ended.

If in S158 the user does not indicate that the printing results are poor (S158:NO), then the routine returns to S157 and waits for indication from the user.

If it is determined in S157 that the user has indicated that the printing results were good (S157:YES), then in S161, the display portion 14 stops displaying the printing results inquiry message on the LCD. The value of the flag B is reset to 0 in S162, and the routine proceeds to S155.

If it is determined in S153 that printing of the backup reception data for all cases has not been completed (S153:NO), this means that the backup reception data is remained for a subsequent case. The routine returns to S144.

If it is determined in S152 that printing of the backup reception data for all pages for the for the present case has not been completed (S153:NO), this means that backup reception data remains for a subsequent page. The routine returns to S144.

If it is determined in S150 that the indication mark could be properly detected (S150:YES), the routine directly proceeds to S152.

If it is determined in S147 that printing of a single page's worth of the backup reception data has not been completed yet (S147:NO), then the routine returns to S146.

If in S145 the count value of the dot counter is not equal to or less than the second threshold value (S145:NO), then in S163, the display portion 14 displays on the LCD the ink empty message informing the user that black ink has run out. Then in S164, the facsimile device is set to the printing prohibition mode. Further, in S171, the value of the flag B is reset to 0. In particular, the CPU 1 retrieves the flag B from the EEPROM 6. If the value of the flag B is 1, the CPU 1 rewrites the value of the flag B to 0. On the other hand, if the value of the flag B is 0, the CPU 1 maintains the value of the flag B as it is.

If in S144 external light is detected (S144:YES), then in S165, the value of the flag B is set to 1. Then in S166, the CPU 1 determines whether or not the count value of the dot counter is equal to or less than the second threshold value.

If so (S166:YES), then in S167, the printing portion 12 performs printing of one band's worth of the backup reception data. Then in S168, the CPU 1 determines whether or not printing of one page's worth of backup reception data has been completed.

If so (S168:YES), then in S169, the CPU 1 determines whether or not printing of the backup reception data for the present case have been completed.

If so (S169:YES), then in S170, the CPU 1 determines whether or not printing of the backup reception data has been completed for all cases.

If so (S170:YES), the routine proceeds to S154.

If it is determined in S170 that printing of the backup reception data has not been completed for all cases (S170:NO), the routine returns to S166.

If it is determined in S169 that printing of the backup reception data has not been completed for all pages of the present case (S169:NO), the routine returns to S166.

If it is determined in S168 that printing of one page's worth of the backup reception data has not been completed (S168:NO), then the routine returns to S167 and continues printing.

If it is determined in S166 that the count value of the dot counter is not equal to or less than the second threshold value (S166:NO), the routine proceeds to S163.

If it is determined in S143 that the mark flag is not ON (S143:NO), this routine is ended. The reason for this is that even if printing of backup reception data is automatically performed, there is no way to determine whether or not printing of the backup reception data has been properly performed without detecting the indication mark.

If it is determined in S141 that the facsimile device is not in the printing prohibition mode (S141:NO), the routine directly proceeds to S143.

As described above, when the mark flag is ON, printing of backup reception data is automatically performed upon completion of cleaning operations. Then, if all indication marks can be properly detected, the corresponding printed backup reception data is automatically erased from the RAM 3. On the other hand, if any indication mark could not be properly detected, a message is displayed to inquired quality of printed pages. Only when the printing results are good, the printed backup reception data is erased.

Next, the manual erasure routine will be described. The manual erasure routine is executed whenever the user performs predetermined key operations to input a particular command for this. The user can erase backup data, including backup reception data and backup transmission data, either after or without executing printing of the backup reception data. The manual erasure routine may be executed when, for example, full color printing needs to be consecutively performed where a large amount of the memory of the RAM 3 is consumed. That is, if backup data is stored in the RAM 3, there is a possibility that copying operations cannot be properly performed because of lack of memory capacity of the RAM. The user can erase unnecessary backup data from the RAM so that sufficient memory capacity for the copying operations can be obtained. Also, the manual erasure routine may be executed whenever the user wishes to perform printing of backup data, not just for color copying.

As described above, backup reception data is stored in the RAM 3 according to combined settings of the mark flag, the backup flag, and presence and absence of external light in the facsimile device. For example, facsimile data received by a facsimile device in the memory reception mode will be stored as backup reception data. Also, backup transmission data is stored if the user wishes. For example, when the user wishes to transmit facsimile data at a later time, for example, the facsimile data, that is, transmission facsimile data, can be stored as backup transmission data in the RAM 3.

The user can obtain and examine a memory status list and/or a transmission information list. Using these lists, the user can gain an understanding of backup data to determine whether or not printing of the backup data is necessary. The memory status list can be either displayed on the LCD or printed on the recording sheet in response to input of a predetermined command. The memory status list shows information such as name and telephone number of a transmission source of received facsimile data as well as a reception time and date. An example of the transmission maintenance list is shown in FIG. 18. The transmission maintenance report is printed at a predetermined timing or whenever the user inputs a command for this. Data for the transmission maintenance information is stored in a predetermined region of the RAM 3 and can be retrieved whenever needed.

Figure 12:
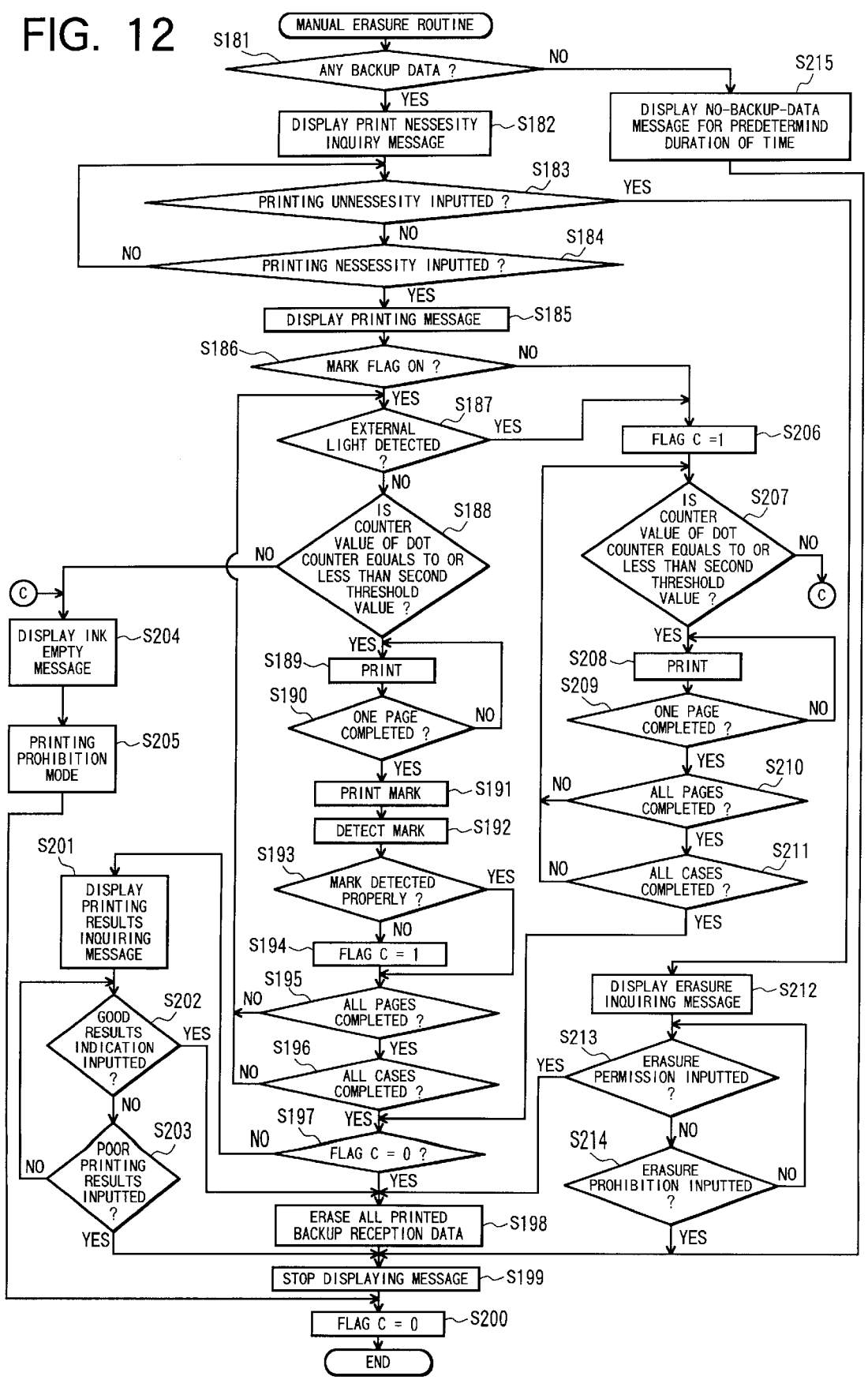
FIG. 12 is a flowchart representing a manual erasure routine of the facsimile device shown in FIG. 1.

Next, processes performed during the manual erasure routine will be described while referring to the flowchart shown in FIG. 12. When the manual erasure routine is started, first, the CPU 1 determines in S181 whether or not any backup data is stored in the RAM 3.

If it is determined in S181 that backup data is stored in the RAM 3 (S181:YES), then in S182, the display portion 14 displays on the LCD a print necessity inquiry message inquiring the user whether or not printing of the backup data should be performed. In particular, the CPU 1 controls the display portion 14 to display a message shown in FIG. 13(a) and a message shown in FIG. 13(B) in alternation. Then, the CPU 1 determines in S183 whether or not the user has indicated printing of the backup data is unnecessary. In particular, when the user presses predetermined key switches of the numeric pad to indicate necessity or unnecessary of printing of the backup data, the operation portion 13 outputs operation signal. Then, the CPU 1 observes the operation signal and investigates whether the user has pressed the No. 2 key.

If the user has not indicated that printing of the backup data is unnecessary (S183:NO), then the CPU 1 determined in S184 whether or not the user has indicated that printing of the backup data is necessary.

If the user has indicated that printing of the backup data is necessary (S184:YES), then in S185, the display portion 14 displays on the LCD a printing message shown in FIG. 14 to inform the user that printing of the backup data is presently being performed. Then in S186, the CPU 1 determines whether or not the mark flag is ON.

If so (S186:YES), the CPU 1 determines in S187 whether or not external light is present in the facsimile device. In particular, the CPU 1 observes a light detection signal from the mark sensor 15 under conditions wherein no recording sheet is positioned at the mark detection position and also wherein the light source of the mark sensor 15 is OFF. Then, the CPU 1 determines in S187 whether or not the detection signal from the mark sensor 15 exceeds the predetermined light value.

If no external light is present in the facsimile device (S187:NO), the CPU 1 determines in S188, whether or not the count value of the dot counter is equal to or less than the second threshold value.

If so (S188:YES), then in S189, the printing portion 12 performs printing of one band's worth of the backup data. In particular, the CPU 1 retrieves the backup data from the RAM 3 and outputs over the gate array 7 to the printing portion 12. The printing portion 12 performs printing of one band's worth of the backup data.

Then in S190, the CPU 1 determines whether or not printing of a single page's worth of the backup data has been completed. If so (S190:YES), the printing portion 12 prints in S191 an indication mark at the predetermined position on the recording sheet. Then the mark sensor 15 detects in S192 the indication mark. The CPU 1 determines in S193 whether or not the indication mark could be properly detected.

If in S193 the indication mark could not be properly detected (S193:NO), then in S194, the value of the flag C is set to 1. In particular, the CPU 1 reads the flag C from the EEPROM 6. If the value of the flag C is 0, the CPU 1 rewrites the value of the flag C to 1. On the other hand, if the value of the flag C is 0, the CPU 1 maintains the value of the flag C as it is. As described above, the value of the flag C represents whether or not the indication mark which has been printed during printing of backup data could be properly detected.

Then, the CPU 1 determines in S195 whether or not printing of the backup data has been completed for all pages of a present case.

If so (S195:YES), the CPU 1 determines in S196 whether or not printing of the backup data has been completed for all cases.

If so (S196:YES), then in S197, the CPU 1 determines whether or not the value of the flag C is 0. If so (S197:YES), this means that all indication marks of all pages of all cases could properly be detected. Therefore, it can be assumed that printing of the backup data for all cases has been properly performed. Then in S198, the backup data is completely erased from the RAM 3. Further in S199, the display portion 14 displays on the LCD either the printing message or an erasure permission message to be described later. Then, the value of the flag C is set to 0 in S200. In particular, the CPU 1 retrieves the flag C from the EEPROM 6. If the value of the flag C is 1, the CPU 1 rewrites the value of the flag C to 0. On the other hand, if the value of the flag C is 0, the CPU 1 maintains the value of the flag C as it is. Then, this routine is ended.

If it is determined in S197 that the value of the flag C is 0 (S197:NO), then there is a possibility that printing of not all backup data has been properly performed. Therefore, in S201, the display portion 14 displays on the LCD the printing results inquiry message, that is, the one shown in FIG. 15(a) and the one shown in FIG. 15(b) in alternately, in order to ask the user whether the printing results are good. The user can exam the printed recording sheet and determines the printing results are good or not.

Then, the CPU 1 determines in S202 whether or not the user has indicated that the printing results are good, that is, whether or not the user has pressed the No. 1 key.

If the user does not indicate that the printing results are good (S202:NO), then the CPU 1 determines in S203 whether or not the user has indicated that the printing results are poor, that is, whether or not the user has pressed the No. 2 key.

If the user indicates the printing results are poor (S203:YES), then the routine proceeds to S199.

If in S203 the user does not indicate that the printing results are poor (S203:NO), then the routine returns to S202 and waits the user to input an indication.

If in S202 the user indicates that the printing results are good (S202:YES), then the routine proceeds to S198.

If it is determined in S196 that printing of the backup data has not been completed for all cases (S196:NO), the routine returns to S187.

If it is determined in S195 that printing of the backup data for all pages of the present case has not been completed (S195:NO), the routine returns to S187.

If in S193 the indication mark could be properly detected (S193:YES), the routine skips S194 and directly proceeds to S195.

If it is determined in S190 that printing of one page's worth of the backup data has not been completed yet (S190:NO), then the routine returns to S189 and printing is continued.

If it is determined in S188 that the count value of the dot counter is not equal to or less than the second threshold value (S188:NO), then in S204, the display portion 14 displays on the LCD the ink empty message indicating that the black ink has run out. Further in S205, the facsimile device is set to the printing prohibition mode, and the routine proceeds to S200.

If in S187 external light is present (S187:YES), then in S206, the value of the flag C is set to 1. Then in S207, the CPU 1 determines whether or not the count value of the dot counter is equal to or less than the second threshold value.

If so (S207:YES), then in S208, the printing portion 12 performs printing of one band's worth of the backup data. Then, the CPU 1 determines in S209 whether or not printing of one page's worth of the backup data has been completed.

If so (S209:YES), the CPU 1 further determines in S210 whether or not printing of the backup data for all page of the present case has been completed.

If so (S210:YES), then in S211, the CPU 1 determines whether or not printing of the backup data for all cases has been completed.

If so (S211:YES), then the routine proceeds to S197.

If it is determined in S211 that printing of the backup data for all cases has not been completed yet (S211:NO), the routine returns to S207.

If it is determined in S210 that printing of the backup data for all pages of the present case has not been completed (S210:NO), the routine returnees to S207.

If it is determined in S209 that printing of one page's worth of the backup data has not been completed yet (S209:NO), then the routine returns to S208.

If it is determined in S207 that the count value of the dot counter is not equal to or less than the second threshold (S207:NO), then the routine proceeds to S204.

If it is determined in S186 that the mark flag is not ON (S186:NO), then the routine proceeds to S206.

If in S184 the user has not indicated that printing of the backup data is necessary (S184:NO), then the routine returns to S183 and waits an indication from the user.

If it is determined in S183 that the user has indicated that printing of the backup data is unnecessary (S183:YES), then in S212, the display portion 14 displays on the LCD the erasure permission message inquiring the user whether the backup data can be erased or not. In particular, the display portion 14 displays a message shown in FIG. 16(a) and a message shown in FIG. 16(b) in alternation each time a predetermined time duration elapses. Then in S213, the CPU 1 determines whether or not the user has indicated that the backup data can be erased, that is, whether or not the user has pressed the No. 1 key of the numeric pad.

If the user does not indicate the backup data can be erased (S213:NO), then in S214, the CPU 1 determines whether or not the user has indicated that the backup data should not be erased, that is, whether or not the user has pressed the No. 2 key.

If the user indicates that the backup data should not be erased (S214:YES), then routine proceeds to S199 without erasing the backup data.

If in S214 the user does not input indication that the backup data should not be erased (S214:NO), then the routine returns to S213 and waits for an indication from the user.

If in S213 the user indicates that the backup data can be erased (S213:YES), then the routine proceeds to S198 whereupon the backup data is erased.

If it is determined in S181 that no backup data is stored in the RAM 3 (S181:NO), then in S215, the display portion 14 displays on the LCD a no-backup-memory message showing in FIG. 17 indicating that no backup data is stored in the RAM 3. The no-backup-memory message is displayed for a predetermined duration of time, for example, for two seconds. Then the routine proceeds to S199.

In this way, the user can optionally erase backup data from the RAM 3 by operating predetermined key switches.

As described above, according to the present invention, when both the mark flag and the backup flag are ON and external light is detected during printing of facsimile data , printing of the facsimile data is stopped, and the facsimile data is stored as backup data in the RAM 3. Therefore, erroneous operations can be prevented even if external light intrudes into the transmission device during printing.

Also, the user can switches the mark flag and the backup flag from ON to OFF or OFF to ON. Therefore, the user's desire whether printing of facsimile data should be stopped or continued and whether the facsimile data should be stored or not when external light intrudes into the transmission device during printing can be taken into consideration.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiment, thee mark flag and the backup flag are provided and operations are selectively performed according to the combinations of these two flags and according to presence and absence of external light. However, there is no need to configure the device of the present invention in this manner. For example, one or neither of the mark flag and the backup flag need to be used. If neither of the mark flag and the backup flag is used, the facsimile device should be configured to always operate as though both the mark flag and the backup flag are ON. If the mark flag is used but no backup flag is provided, operations should be performed as though the backup flag is continually ON. Further, if the backup flag is used but no mark flag is provided, operations should be performed as though the mark flag is ON.

Also, in the present embodiment, a necessary amount of backup data which has been printed is automatically erased from the RAM 3 when the RAM 3 is in the full condition. However, the user can prohibit the automatic erasure of backup data by operating predetermined key switches.

Although liquid ink is used in the above-described embodiment, solid type print materials, such as hot melt ink, or powder type print materials, such as toner, can be used.

Also, in the above-described embodiment, cartridges are exchanged when ink runs out. However, a reusable type of cartridge can be used. In this case, when ink runs out, a cartridge is refilled with ink without the cartridge being replaced.

Also, a plurality of different colored inks can be used for enabling color printing or only a single color ink can be used for monochrome printing.

Instead of a single cartridge capable of storing each different colored ink separately, a plurality of cartridges each storing a different colored ink can be used.

The transmission circuit can be a public telephone line or a dedicated line or can be a wire transmission circuit or a wireless transmission circuit.

Any type of memory can be used, for example, a RAM, a flash memory, or a hard disk.

Further, the indication mark can be any shape or color. However, it should be noted that ink for printing image information and ink for printing an indication mark are supplied through the same ink passages from the same cartridge, and so should be the same color.

Although in the above-described embodiment, the facsimile device includes an ink jet type printing device, the facsimile device can include any type of printing device, such as a photoelectric type printer, as long as it is capable of printing of data.

The mark detection sensor can be any type of unit as long as it is capable of detecting an indication mark based on light reflected from the indication mark.

Although the mark sensor 15 detected both external light and an indication mark in the above-described embodiment, two separate sensors can be provided each for detecting one of external light and indication marks.

Although the facsimile device is described as an example of a transmission device in the above-described embodiment, any type of transmission device, such as a multifunction peripheral device, can be used. A multifunction peripheral device is a device connected to a computer, such as a personal computer, and includes a variety of different functions, such as a facsimile transmission function, a printer function, an image scanner function, or a copy function.

Although in the above-described embodiment the user inputs commands by simultaneously pressing down two different predetermined key switches, the user can input commands by any other appropriate manner.

What is claimed is:

1. A transmission device, comprising:
   a frame defining an internal space;
   a receiving unit that is connected to a remote transmission device and receives image data from the remote transmission device;
   a buffer memory that temporarily stores the image data;
   a storage member that stores and supplies recording material;
   a print unit that prints an image based on the image data and an indication mark on a recording medium having a print region and an outside region outside the print region, the print unit printing the image within the print region and the indication mark at a first predetermined position in the outside region using the recording material supplied from the storage member;
   a backup memory;
   a first sensor mounted within the internal space that detects the indication mark printed on the recording medium;
   a second sensor co-mounted in the internal space that detects external light in the internal space;
   first control means for controlling the print unit to print the image;
   second control means for controlling the print unit and the backup memory, wherein when the first sensor detects that the indication mark is unacceptable while the print unit is printing under the aegis of the first control means, the second control means controls the print unit to stop printing and the backup memory to start storing the image data; and
   third control means for controlling the print unit and the backup memory, wherein when the second sensor detects external light while the print unit is printing under the aegis of the first control means, the third control means controls the print unit to stop printing, and the backup memory to start storing the image data.

2. The transmission device according to claim 1, wherein, when the first sensor detects that the indication mark is unacceptable while the print unit is printing under the aegis of the first control means, the first sensor and the second sensor are disabled.

3. The transmission device according to claim 1, wherein when the second sensor detects external light while the print unit is printing under the aegis of the first control means, the first sensor and the second sensor are disabled.

4. The transmission device according to claim 1, further comprising fourth control means for controlling the print unit to print the image based on the image data stored in the backup memory after the backup memory completes storing the image data under the aegis of the third control means.

5. The transmission device according to claim 4, wherein the fourth control means also controls the backup memory to erase the image data after the print unit completes printing the image under the aegis of the fourth control means.

6. The transmission device according to claim 1, wherein the third control means is set to selectively one of a first state and a second state, and wherein when the third control means is in the first state and the second sensor detects external light while the print unit is printing under the aegis of the first control means, the third control means controls the print unit to stop printing and the backup memory to start storing the image data, and when the third control means is in the second state and the second sensor detects external light while the print unit is printing under the aegis of the first control means, the third control means controls the print unit to continue printing.

7. The transmission device according to claim 6, further comprising an operation unit through which a user inputs a command, wherein the user selects either the first state or the second state of the third control means by inputting the command through the operation unit.

8. The transmission device according to claim 6, wherein the print unit is set to select one of a first mode in which the print unit prints the indication mark and a second node in which the print unit does not print the indication mark, and the third control means is set to select one of the first state, the second state, a third state, and a fourth state, wherein when the print unit is in the first mode, the third control means is selectively set to the first state or the second state, and when the print unit is in the second mode, the third control means is selectively set to the third state or the fourth state, and wherein when the receiving unit receives the image data while the third control means is in the third state, the third control means controls the print unit to print the image, and the backup memory to store the image data, and when the receiving unit receives the image data while the third control means is in the fourth state, the third control means controls the print unit to print the image and the backup memory not to store the image data.

9. The transmission device according to claim 8, further comprising an operation unit through which a user inputs a command, wherein the user selects either the first mode or the second mode of the print unit, either the first state or the second state of the third control means when the print unit is in the first mode, and either the third state or the fourth state of the third control means when the print unit is in the second mode by inputting the command through the operation unit.

10. The transmission device according to claim 8, wherein when the print unit is in the second mode, the first sensor and the second sensor are disabled.

11. The transmission device according to claim 1, wherein the recording material is ink, the print unit is an ink jet printing device including a print head formed with a nozzle through which the ink is ejected toward the recording medium, and the storage member is a cartridge detachably mounted on the print head.

12. The transmission device according to claim 1, wherein the first sensor is a reflection type photoelectric tube having a light source that emits light onto the indication mark, and the first sensor detects the indication mark based on light reflected from the indication mark.

13. A transmission device, comprising:
   a frame defining an internal space;
   a storage member that stores and supplies a recording medium;
   a receiving unit that is connected to a remote transmission device and receives image data from the remote transmission device;
   a buffer memory that temporarily stores the image data;
   a print unit that prints an image based on the image data within a print region and an indication mark at a first predetermined position in an outside region on a recording medium using the recording medium supplied from the storage member;

a backup memory;

a first sensor mounted within the internal space that detects the indication mark printed on the recording medium; and a second sensor co-mounted in the internal space that detects external light at a second predetermined position, wherein when the first sensor properly detects the indication mark while the print unit is printing, the print unit continues printing, and the backup memory does not store the image data, when the first sensor detects that the indication mark is unacceptable while the print unit is printing and the second sensor does not detect external light, the print unit stops printing, and the backup memory stores the image data, and when the second sensor detects external light while the print unit is printing, the print unit stops printing, and the backup memory stores the image data.

14. A program storage medium storing a program for controlling a transmission device comprising a frame defining an internal space, the program comprising:

a reception program for receiving image data;

a temporary storing program for temporarily storing the image data into a buffer memory;

a first printing program for printing an image based on the image data and an indication mark on a recording medium when the image data is received;

a first detecting program for detecting the indication mark printed on the recording medium at a predetermined position within the internal space;

a first judging program for judging whether the indication mark is detected properly or is unacceptable;

a second detecting program for attempting to detect external light at the predetermined position;

a second judging program for judging whether the external light is detected or not;

a first stopping program for stopping printing when the indication mark detected is unacceptable while the image and the indication mark are being printed and external light is not detected;

a first storing program for storing the image data into a backup memory when the indication mark is detected as unacceptable while the image and the indication mark are being printed and external light is not detected;

a second stopping program for stopping printing when external light is detected while the image and the indication mark are being printed; and a second storing program for storing the image data into the backup memory when external light is detected while the image and the indication mark are being printed.

15. The program storage medium according to claim 14, wherein the program further comprises a third judging program for judging whether or not a first flag is in a first state or a second state, a first executing program for executing the second stopping program and the second storing program when the first flag is in the first state, and a first controlling program for disabling the second stopping program and the second storing program when the first flag is in the second state.

16. The program storage medium according to claim 14, wherein the program further comprises a third judging program for judging whether a first flag is in a first state or a second state, a fourth judging program for judging whether a second flag is in a first mode in which the indication mark is printed or a second mode in which the indication mark is not printed, a second executing program for executing the second stopping printing program and the second storing program when the first flag is in the first state and the second flag is in the first mode, a second control program for disabling the second stopping program and the second storing program when the first flag is in the second state and the first flag is in the first mode, a third control program for disabling the first detecting program, the second detecting program, the first judging program, and the second judging program when the second flag is in the second mode, and a third storing program for storing the image data into the backup memory when the first flag is in the first state and the second flag is in the second mode.

17. A method of controlling a transmission device comprising a frame defining an internal space, the method comprising the steps of:

(a) receiving image data;

(b) temporarily storing the image data into a buffer memory;

(c) starting printing an image based on the image data and an indication mark on a recording medium when the image data is received;

(d) detecting the indication mark printed on the recording medium at a predetermined position within the internal space;

(e) judging whether the indication mark is detected properly or as unacceptable;

(f) attempting to detect external light at the predetermined position;

(g) stopping printing when the indication mark is detected as unacceptable while the image and the indication mark are being printed and external light is not detected;

(h) storing the image data into a backup memory when the indication mark is detected as unacceptable while the image and the indication mark are being printed and external light is not detected;

(i) stopping printing when external light is detected while the image and indication mark are being printed; and (j) storing the image data into the backup memory when external light is detected while the image and the indication mark are being printed.

18. The method according to claim 17, further comprising the steps of (k) judging whether a first flag is in a first state or a second state, (l) executing the steps (i) and (j) when the first flag is in the first state, and (m) disabling the steps (i) and (j) when the first flag is in the second state.

19. The method according to claim 17, further comprising the step of (n) judging whether a first flag is in a first state or a second state, (o) judging whether a second flag is in a first mode in which the indication mark is printed or a second mode in which the indication mark is not printed, (p) executing the steps of (i) and (j) when the first flag is in the first state and the second flag is in the first mode, (q) disabling the step of (i) and (j) when the first flag is in the second state and the second flag is in the first mode, (r) disabling the steps of (d), (e), and (f) when the second flag is in the second mode, and (s) storing the image data upon the image data being received when the when the first flag is in the first state and the second flag is in the second mode.

* * * * *